(12) United States Patent
Vargo

(10) Patent No.: US 11,063,776 B2
(45) Date of Patent: Jul. 13, 2021

(54) SYSTEM AND METHOD FOR OPERATING NETWORKED COMPUTER SYSTEMS FOR USE IN COMMUNICATING WITH MOBILE DEVICES

(71) Applicant: QuickTutor, LLC, Rochester, MI (US)

(72) Inventor: Collin J. Vargo, Wyandotte, MI (US)

(73) Assignee: QUICKTUTOR, LLC, Rochester, MI (US)

( * ) Notice: Subject to any disclaimer, the term of this patent is extended or adjusted under 35 U.S.C. 154(b) by 209 days.

(21) Appl. No.: 16/383,493

(22) Filed: Apr. 12, 2019

(65) Prior Publication Data

US 2019/0319812 A1    Oct. 17, 2019

Related U.S. Application Data

(60) Provisional application No. 62/657,159, filed on Apr. 13, 2018.

(51) Int. Cl.
| | |
|---|---|
| *G06F 16/29* | (2019.01) |
| *H04L 12/18* | (2006.01) |
| *G06F 16/23* | (2019.01) |
| *G09B 5/06* | (2006.01) |
| *H04L 29/08* | (2006.01) |
| *H04W 4/02* | (2018.01) |

(52) U.S. Cl.
CPC ...... *H04L 12/1818* (2013.01); *G06F 16/2379* (2019.01); *G06F 16/29* (2019.01); *G09B 5/065* (2013.01); *H04L 12/1822* (2013.01); *H04L 67/18* (2013.01); *H04L 67/306* (2013.01); *H04W 4/023* (2013.01)

(58) Field of Classification Search
CPC ...... H04L 12/1818; G06F 16/29; G09B 5/065
USPC ........................................................ 709/204
See application file for complete search history.

(56) References Cited

U.S. PATENT DOCUMENTS

2019/0066528 A1* 2/2019 Hwang ................ H04W 4/029

* cited by examiner

*Primary Examiner* — Sibte H Bukhari
(74) *Attorney, Agent, or Firm* — Howard & Howard Attorneys PLLC

(57) ABSTRACT

A networked computer system for transmitting information between mobile computing devices to connect learners to tutors is described herein. The networked computer system includes a processor programmed to display a tutoring subject search page on the first mobile computing device associated with a learner user including a plurality of tutoring subjects and a plurality of eligible tutors associated with each tutoring subject. Each eligible tutor is determined based on a geographic location of the learner user, a geographic location of the tutor, and a travel distance limit determined by the tutor. The processor is also programmed to initiate tutoring sessions between the learner user and a selected tutor via video calls, and generate tutoring session data files that includes information associated with each tutoring session.

16 Claims, 20 Drawing Sheets

| Tutor User ID | User Data | Tutoring Subject | Tutoring Preference/Policy Data | Hourly Rate | Travel Distance | Current Location Data | Mobile Device ID |
|---|---|---|---|---|---|---|---|
| Tutor01 | Name; Email; Photos; Bio | Mathematics; Chemistry | In-person | 25 | 25 miles | 43.595450,-84.774701 | 734-555-1234 |
| Tutor102 | Name; Email; Photos; Bio | Statistics | In-person; Video | 15 | 50 miles | 43.599601,-84.772292 | 734-555-2345 |
| Tutor0223 | Name; Email; Photos; Bio | Spanish; French | Video | 20 | Global | 43.594325,-84.773562 | 734-555-9999 |

| Learner User ID | User Data | Preference | Max. Hourly Rate | Travel Distance | Current Location Data | Mobile Device ID | Connected Tutors | Previous Subjects | Associated Tutor User ID |
|---|---|---|---|---|---|---|---|---|---|
| Leaner125 | Name; Email; Photos; Bio | In-person | 30 | 50 miles | 43.599601,-84.772292 | 734-555-1234 | Tutor102; Tutor001 | Mathematics; Chemistry | Tutor001 |
| Leaner201 | Name; Email; Photos; Bio | Video | 120 | Global | 43.594325,-84.773562 | 734-555-9999 | Tutor0223; Tutor0343; Tutor0021 | Language; Spanish; Italian | N/A |

| Session ID | Tutor ID | Learner ID | Duration | Hourly Rate | Subject | Tutor Rating |
|---|---|---|---|---|---|---|
| Session201 | Tutor234 | Learner320 | 1 hr | 25 | Mathematics | 5 |
| Session202 | Tutor014 | Learner202 | 1.5 hr | 20 | Spanish | 4 |
| Session212 | Tutor445 | Leaner012 | 2 hr | 15 | Chemistry | 5 |

FIG. 8

SYSTEM AND METHOD FOR OPERATING NETWORKED COMPUTER SYSTEMS FOR USE IN COMMUNICATING WITH MOBILE DEVICES

CROSS-REFERENCE TO RELATED APPLICATION

This application claims the benefit of U.S. Provisional Patent Application Ser. No. 62/657,159, filed on Apr. 13, 2018, all of which is hereby incorporated by reference in its entirety for all purposes.

COPYRIGHT NOTICE

The figures included herein contain material that is subject to copyright protection. The copyright owner has no objection to the facsimile reproduction by anyone of this patent document as it appears in the U.S. Patent and Trademark Office, patent file or records, but reserves all copyrights whatsoever in the subject matter presented herein.

FIELD OF THE DISCLOSURE

The present invention relates to a networked computer system and methods of operating a networked computer system to provide communication between mobile computing devices.

BACKGROUND

Physical tutoring centers have limited hours of availability, difficult scheduling, and most often only offer tutoring in math and writing. Currently, at least some known computer systems are enable to connect students to tutors in various academic subjects, disciplines, skills, hobbies, or art forms. For example, current research indicates that 85% of Students have difficulty finding tutors, and 90% of students cannot afford professional tutors. In addition, student-tutors or university-hired tutors undergo difficult hiring processes and are paid minimum wage to work at the college tutoring centers. In addition, there is a 28% year-on-year increase in parental tutoring demand that the existing tutoring market is unable to meet. For example, at least some known online solutions require significant computer server resources and require 3-5 day processes to become a tutor and require 40-50% of a tutor's fare. Accordingly, there is need for an improved computer system that provides an improved user experience and enables student to use mobile devices, such as smartphones, to search, find, and connect with tutors in an efficient and inexpensive manner.

The present invention is aimed at one or more of the problems identified above.

SUMMARY OF THE INVENTION

In one embodiment of the present invention, a networked computer system for transmitting information between mobile computing devices is provided. The networked computer system includes a database and a server computer for use in displaying information on a plurality mobile computing devices. The databased includes a plurality of learner profile records and a plurality of tutor profile records. Each learner profile record is associated with a learner user and includes a unique learner ID, a learner user's mobile phone number, and learner geographic location information. Each tutor profile record is associated with a tutor user and includes a unique tutor ID, tutor profile information, tutoring subject category information, a tutor user's mobile phone number, tutor geographic location data, travel distance limit information, and a tutoring rate. The server computer includes a processor coupled to a memory device. The processor is programmed to display the information on the plurality of mobile computing device by executing an algorithm including receiving a launch request from a first mobile computing device associated with a learner user to launch a tutor search application on the first mobile computing device, and responsively displaying a tutoring subject search page on the first mobile computing device. The processor identifies a learner profile record associated with the first mobile computing device and determines a geographic location of the learner user based on the learner geographic location information included in the identified learner profile record. The processor displays a plurality of tutoring subjects on the tutoring subject search page and, for each displayed tutoring subject, identifies tutor profile records that include tutoring subject category information matching a corresponding tutoring subject. The processor determines a geographic location of each tutor user associated with each identified tutor profile record based on tutor geographic location information included in each identified tutor profile record and identifies a travel distance limit of the corresponding identified tutor profile record. The processor determines eligible tutor profile records based on the determined geographic location of the learner user, the determined geographic location of each tutor user associated with each identified tutor profile record, and a corresponding travel distance limit included in each identified tutor profile record. The processor then displays a tutor profile image associated with each determined eligible tutor profile record on the tutoring subject search page with each tutor profile image being displayed with the corresponding tutoring subject.

In another embodiment of the present invention, a method of operating a networked computer system for transmitting information between mobile computing devices is provided. The networked computer system includes a server computer for use in displaying information on a plurality mobile computing devices. The server computer includes a data file stored in a memory device and a processor coupled to the memory device. The data file includes a plurality of learner profile records and a plurality of tutor profile records. Each learner profile record is associated with a learner user and includes a unique learner ID, a learner user's mobile phone number, and learner geographic location information. Each tutor profile record is associated with a tutor user and includes a unique tutor ID, tutor profile information, tutoring subject category information, a tutor user's mobile phone number, tutor geographic location data, travel distance limit information, and a tutoring rate. The method includes the processor receiving a launch request from a first mobile computing device associated with a learner user to launch a tutor search application on the first mobile computing device, and displaying a tutoring subject search page on the first mobile computing device. The processor identifies a learner profile record associated with the first mobile computing device and determines a geographic location of the learner user based on the learner geographic location information included in the identified learner profile record. The processor displays a plurality of tutoring subjects on the tutoring subject search page and, for each displayed tutoring subject, identifies tutor profile records that include tutoring subject category information matching a corresponding tutoring subject. The processor determines a geographic location of each tutor user associated with each identified tutor profile record based on tutor geographic location information included in each identified tutor profile record and identifies a travel distance limit of the corresponding identified tutor profile record. The processor determines eligible tutor profile records based on the determined geographic location of the learner user, the determined geographic location of each tutor user associated with each identified tutor profile record, and a corresponding travel distance limit included in each identified tutor profile record. The processor then displays a tutor profile image associated with each determined eligible tutor profile record on the tutoring subject search page with each tutor profile image being displayed with the corresponding tutoring subject.

In yet another embodiment, one or more non-transitory computer-readable storage media, having computer-executable instructions embodied thereon are provided. When executed by at least one processor, the computer-executable instructions cause the processor to store a plurality of learner profile records and a plurality of tutor profile records in a database. Each learner profile record is associated with a learner user and includes a unique learner ID, a learner user's mobile phone number, and learner geographic location information. Each tutor profile record is associated with a tutor user and includes a unique tutor ID, tutor profile information, tutoring subject category information, a tutor user's mobile phone number, tutor geographic location data, travel distance limit information, and a tutoring rate. The processor receives a launch request from a first mobile computing device associated with a learner user to launch a tutor search application on the first mobile computing device, and displays a tutoring subject search page on the first mobile computing device. The processor identifies a learner profile record associated with the first mobile computing device and determines a geographic location of the learner user based on the learner geographic location information included in the identified learner profile record. The processor displays a plurality of tutoring subjects on the tutoring subject search page and, for each displayed tutoring subject, identifies tutor profile records that include tutoring subject category information matching a corresponding tutoring subject. The processor determines a geographic location of each tutor user associated with each identified tutor profile record based on tutor geographic location information included in each identified tutor profile record and identifies a travel distance limit of the corresponding identified tutor profile record. The processor determines eligible tutor profile records based on the determined geographic location of the learner user, the determined geographic location of each tutor user associated with each identified tutor profile record, and a corresponding travel distance limit included in each identified tutor profile record. The processor then displays a tutor profile image associated with each determined eligible tutor profile record on the tutoring subject search page with each tutor profile image being displayed with the corresponding tutoring subject.

BRIEF DESCRIPTION OF THE FIGURES

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein:

FIGS. 6-8 are illustrations of exemplary data records generated by the system of FIG. 1, according to embodiments of the present invention.

DETAILED DESCRIPTION

Figure 1:
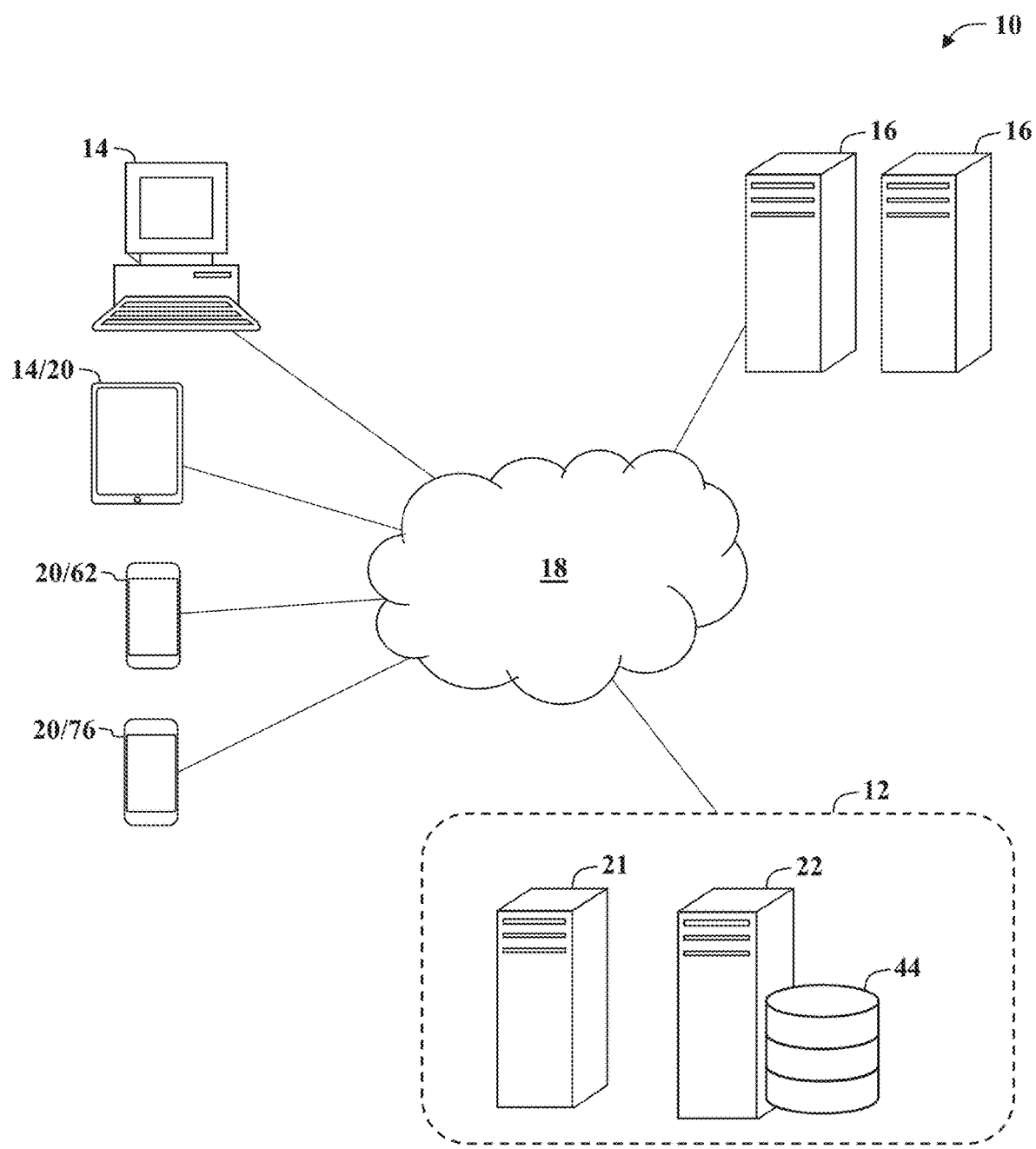
FIG. 1 is a schematic illustrating various aspects of a system, according to the present invention.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible media of expression having computer-usable program code embodied in the media.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

With reference to the FIGS. and in operation, the present invention provides a networked computer system 10, methods and computer product media that improves existing computer systems by providing a networked computer system 10 than enables user to search and connect with other users using smartphones to allows users to create user profile accounts including information associated with subject matter expertise, to search user profiles meeting specific user defined criteria, and connect and communicate with other users via mobile devices. The networked computer system 10 also monitors the use of the features provided by the system to generate data records associated with user activity and generate and display data trends associated with user activity.

In general, the system 10 executes a computer application software program, e.g. QuickTutor™ that connects anyone who wants to learn to the person who can teach them, in real time, using mobile computing devices. Either through video-call instantly or meeting up in person through location services. Tutors set their own prices, and learners pay per minute, as they learn. This is including all aspects of life: Academics; Health & Wellness; Language; Tech; Auto; The Arts; Remedial; Outdoors; Experiences; Sports & Games; Trades; Business. For our twelve categories that essentially make up life, the system includes six subcategories in each, which helps organize a search engine that enables the learner to operate the system 10 to search through specific subjects by typing or selecting subcategories and then instantly finding tutors who teach the subjects they need help in. Moreover, the system 10 enables learners to browse a subject data feed on a home page and select a featured tutor to connect and book sessions. Or the leaner can search for a specific subject—anything from carpentry, to pottery, cooking or knitting. Tutoring/Learning sessions are scheduled through a messaging service provided through the system 10 and then facilitated through in-person menus where both parties confirm the meet-up through location services, or through an online/video calling.

Figure 2:
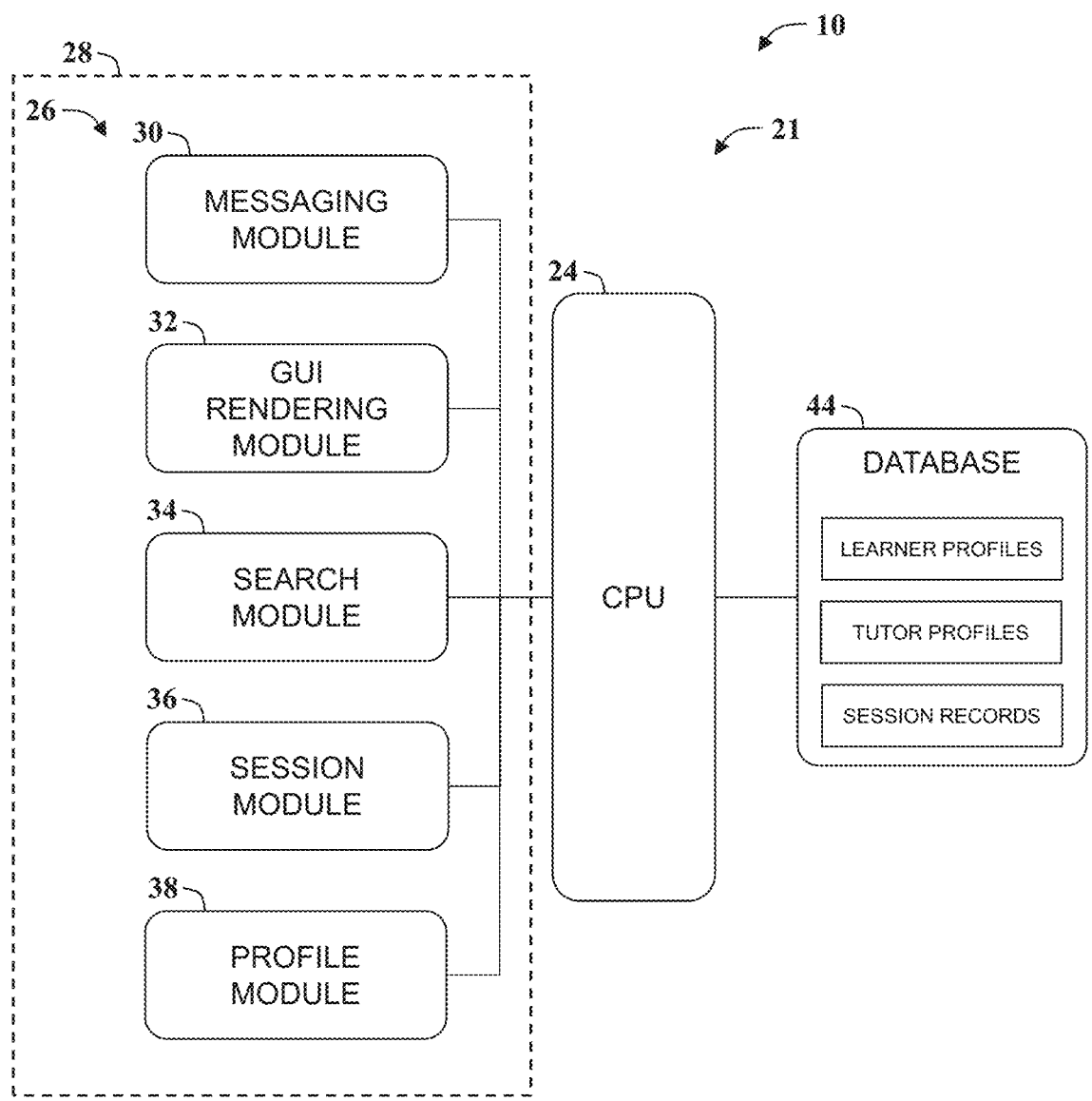
FIG. 2 is a schematic illustrating example components of a server computer that may be used with the system shown in FIG. 1, according to an embodiment of the present invention.

Referring to FIGS. 1 and 2, in the illustrated embodiment, the system 10 includes a server system 12 that is coupled in communication with one or more user computing devices 14 and one or more $3^{rd}$ party entity server systems 16 via a communications network 18. The communications network 18 may be any suitable connection, including the Internet, file transfer protocol (FTP), an Intranet, LAN, a virtual private network (VPN), cellular networks, etc. . . . , and may utilize any suitable or combination of technologies including, but not limited to wired and wireless connections, always on connections, connections made periodically, and connections made as needed.

The user computing device 14 may include any suitable device that enables a user to access and communicate with the system 10 including sending and/or receiving information to and from the system 10 and displaying information received from the system 10 to a user. For example, in one embodiment, the user computing device 14 may include, but is not limited to, a desktop computer, a laptop or notebook computer, a tablet computer, smartphone/tablet computer hybrid, a personal data assistant, a handheld mobile device including a cellular telephone, and the like. The user computing device 14, as well as any other connected computer systems and their components included in the system 10, can create message related data and exchange message related data (e.g., near field communication ("NFC") payloads, Bluetooth packets, Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Figure 9:
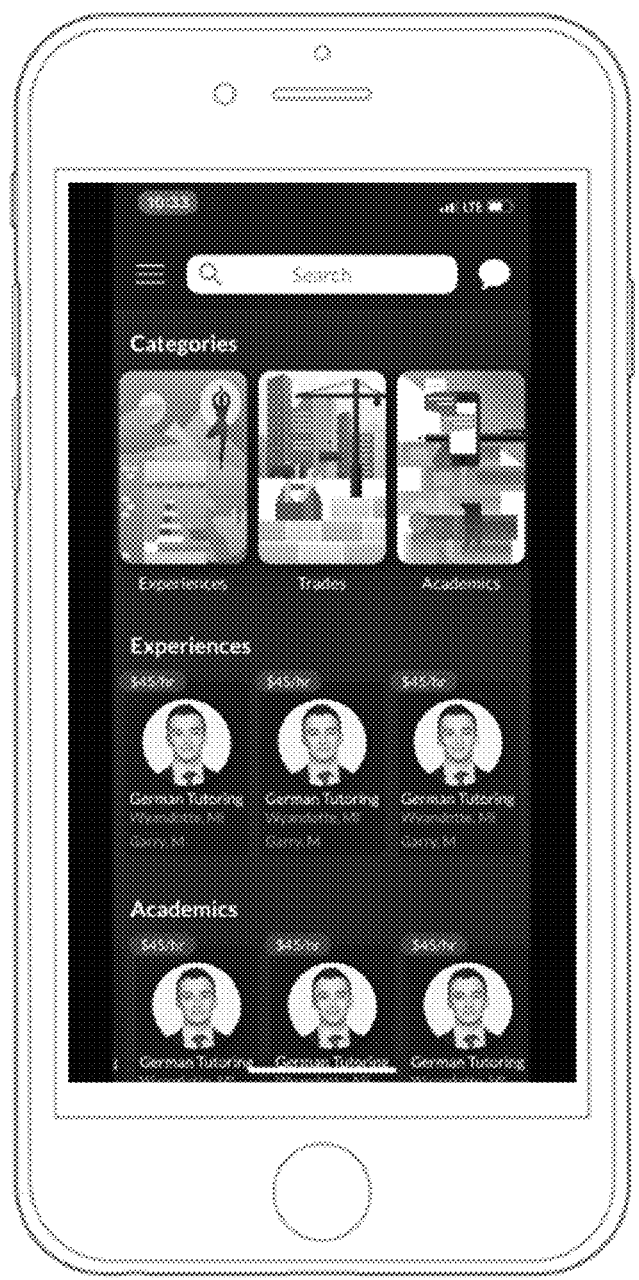
FIG. 9 is a schematic illustration of a mobile computing device that may be used with the system shown in FIG. 1.
Figure 10:
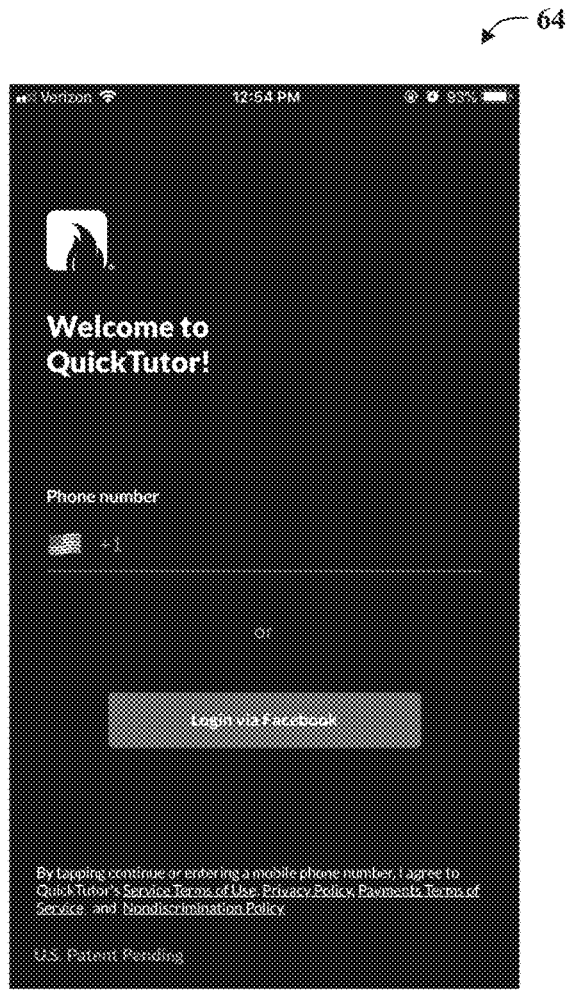
FIGS. 10-37 are illustrations of exemplary screenshots from the system of FIG. 1, according to an embodiment of the present invention.
Figure 11:
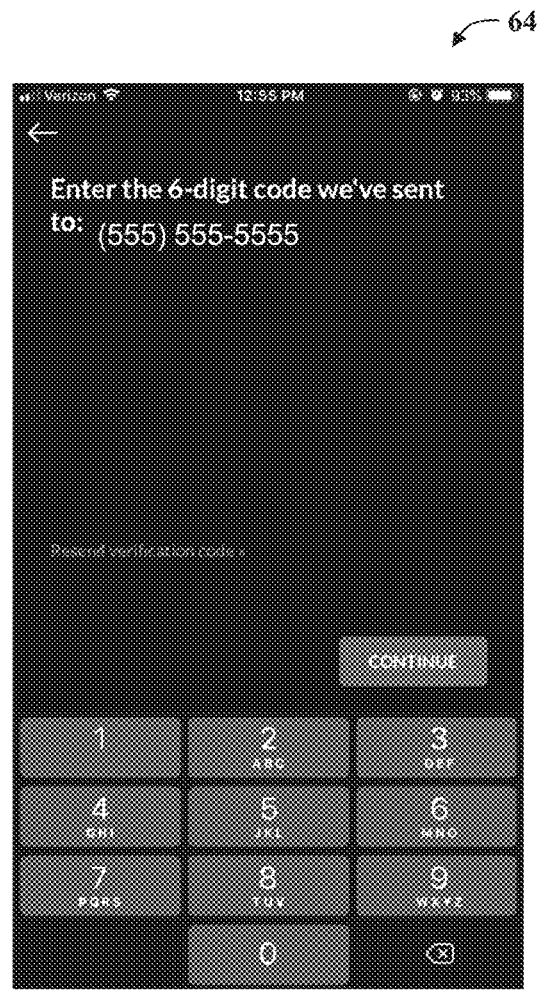

In one embodiment, the user computing device includes a mobile computing device 20 (shown in FIG. 9) such as, for example, a smartphone such as an iPhone™. The mobile computing device 20 includes a processor coupled to a memory device, and a database for storing various programs and data for use in operating the mobile computing device 20. The mobile computing device 20 may also include a touchscreen display device, one or more video image cameras, one or more speakers, a microphone, at least one input button, and one or more sensors including, but not limited to, a touch ID fingerprint sensor coupled to an input button, a barometer, a three-axis gyro, an accelerometer, proximity sensor, and an ambient light sensor. In addition, the mobile computing device 20 may also include a Wi-Fi antenna, a cellular network antenna, a Bluetooth™ communications device, assisted GPS and GLONASS, a digital compass, and an iBeacon microlocation device.

In the illustrated embodiment, the system 10 installs a mobile computer application program on the mobile computing device 20 for use in operating the mobile computing device 20 to display various graphical user interfaces (shown in FIGS. 10-37) that enable the user to interact with the system 10 and communicate with other mobile computing devices 20 via the system 10. The mobile computing device 20 may be programmed to store and execute mobile computer program applications that display the graphical user interfaces on the device touchscreen that allows the user to access the server system 12 to retrieve and store information within the server system 12 as well as interact with and operate the server system 12. In addition, in one embodiment, the server system 12 may install one or more mobile computer application programs in the memory device of the mobile computing device 20. When initiated by the processor of the mobile computing device 20, the mobile computer application program causes the processor of the mobile computing device 20 to perform some or all of the functions of the server system 12. In the illustrated embodiment, the mobile computer application program installed by the server system 12 is configured to operate with Apple iOS™, Android OS™ and/or any suitable operating system program language installed on the user computing devices 14.

In the illustrated embodiment, the $3^{rd}$ party entity server systems 16 are associated with service entities that provide social media services such as, for example, Facebook™, Twitter™, Instagram™, Google™, etc. The server system 12 is programmed to communicate with the $3^{rd}$ party entity server systems 16 to transmit and receive information associated with the user and/or contained in user accounts being stored in the $3^{rd}$ party entity server systems 16. In addition the $3^{rd}$ party entity server systems 16 may also be associated with entities providing geolocation and mapping data such as, for example, Google Maps™, payment transaction services such as Stipe™, and/or video conferencing services such as, for example, Twilio™.

The server system 12 includes an application server 21 and a database server 22. Referring to FIG. 2, in the illustrated embodiment, the application server 21 includes a processing device 24 configured to executes various software program modules 26 being stored in a memory device 28, and thereby controls components of the system server 12 according to user instructions received from the user computing device 14. The memory device 28 may include memory, e.g., read only memory (ROM) and random access memory (RAM), storing processor-executable instructions. The processing device 24 includes one or more processors that execute the processor-executable instructions. In embodiments where the processing device 24 includes two or more processors, the processors can operate in a parallel or distributed manner.

In the illustrated embodiment, the processing device 24 may execute processor-executable instructions being stored in the memory device 28 include a messaging module 30, a graphical user interface (GUI) rendering module 32, a search module 34, a session module 36, and a profile module 38. The messaging module 30 includes processor-executable instructions for transmitting and receiving data between mobile computing device 20 and the $3^{rd}$ party server 16. For example, the messaging module 30 may include processor-executable instructions that include Facebook™ API for signing in users and collecting public user data, Instagram™ API for collecting public user data, mostly images; Stripe™

API for processing payment charges to users for their tutoring fees, pay tutors, check for fraud, get analysis of each customer's spending, keep financial analysis of how much tutors have made via QuickTutor™, check credit card/bank account validity, check for successful funds transfers, user wallet, control payouts to users, generate tokens to store sensitive user data, and transfer money back and forth between users for confirmed cancellation and late fees; and Twilio™ API for allowing users to video call each other for online tutoring sessions.

In one embodiment, the messaging module 30 may also include Google Firebase™ function code for transmitting to and retrieving information from the database server 22 to store user data, name, address, geolocation, subjects, analytics, payments, hours taught, messages amongst other users, check online presence, including overall user data needed for in-app functions on the mobile computing device 20. In addition, the messaging module 30 may include FireChat™ API including a very fast messaging API that operates through Google Firebase™.

The GUI rendering module 32 includes processor-executable instructions for generating graphical images on mobile computing devices 20. For example, the GUI rendering module 32 may include Snapkit™ API including an open source library used for controlling the placement of views and images on a screen. In one embodiment the GUI rendering module 32 may generate application code that includes instructions which cause the mobile computing device 20 to initiate the calls to services to the application server 21 to receive the object data from the application server 21 for use in generating the rendered HTML code string to display the graphic images on the mobile computing device 20.

Figure 3:
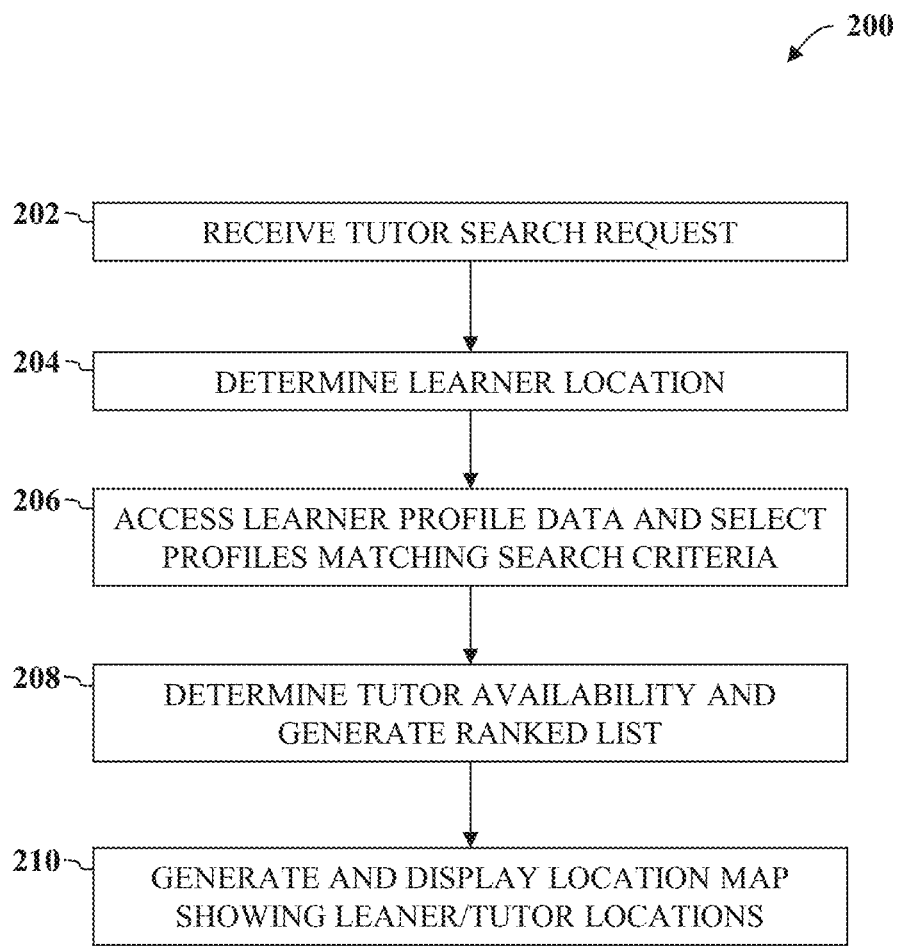
FIGS. 3-5 are flowcharts of methods that may be used with the system shown in FIG. 1, according to embodiments of the present invention.
Figure 4:
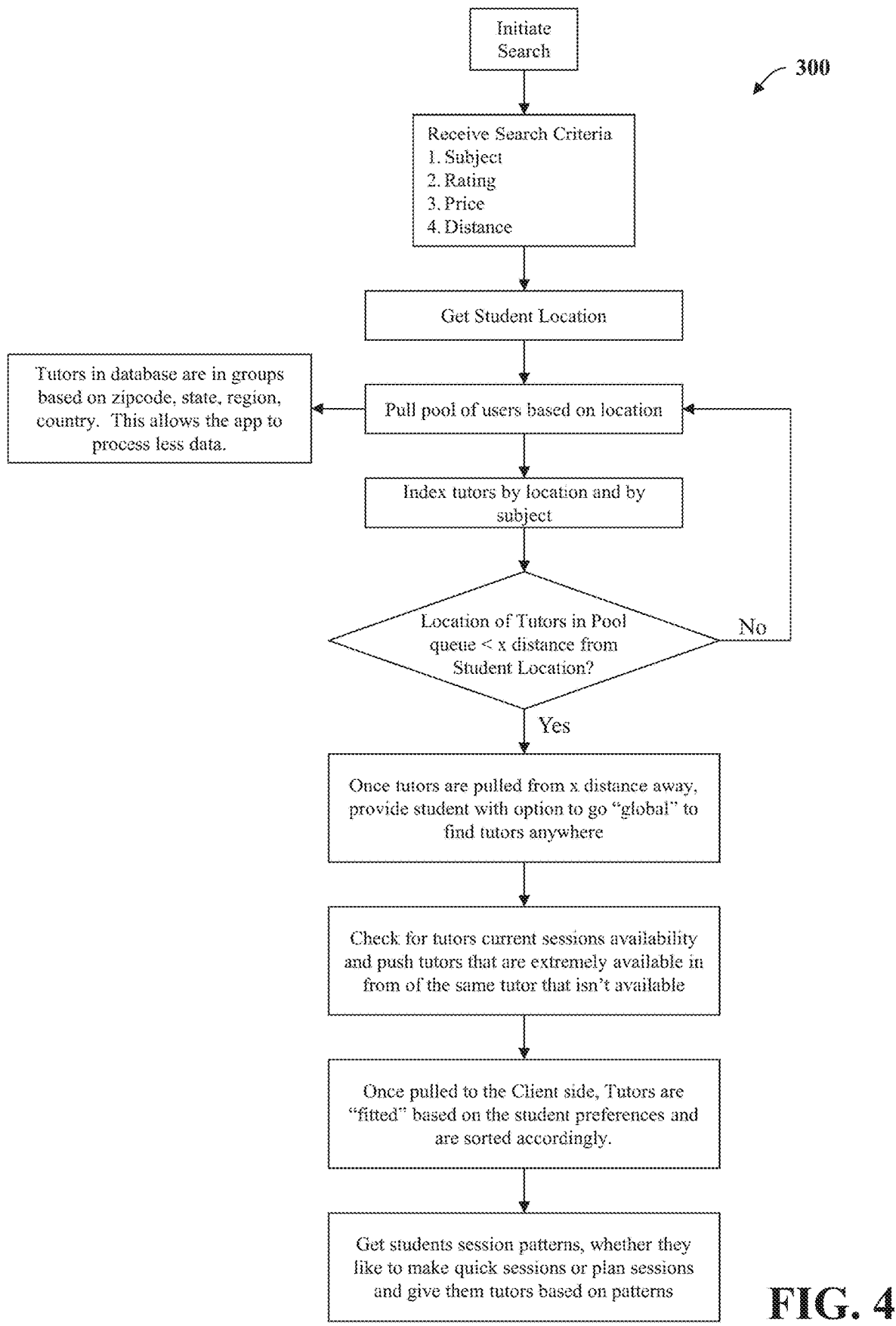

The search module 34 is configured to perform search functions and includes processor-executable instructions for executing the search algorithms shown in FIGS. 3 and 4 that enable users to search and display information related to information being generating by the server system 12. In the illustrated embodiment, the search module 34 uses a current user's latitude and longitude to create a Geohash (not unique) to query through Firebase™ and find users in close proximity efficiently. Firebase™ will hold user unique identifiers in a parent node called "GeoLocation" which it will search through with a specific prefix depending on a user's Geohash. This will allow the search to be optimized for real time functionality. Tutors that fit the distance criteria are chosen and downloaded to the client's phone. The matchmaking algorithm will go through the list of queried tutors and give each of them a rating based on how well they fit the users search criteria. After every tutor is given a rating, the search module 34 sorts the list of tutors by highest rating and then display them to the user in that order.

Figure 5:
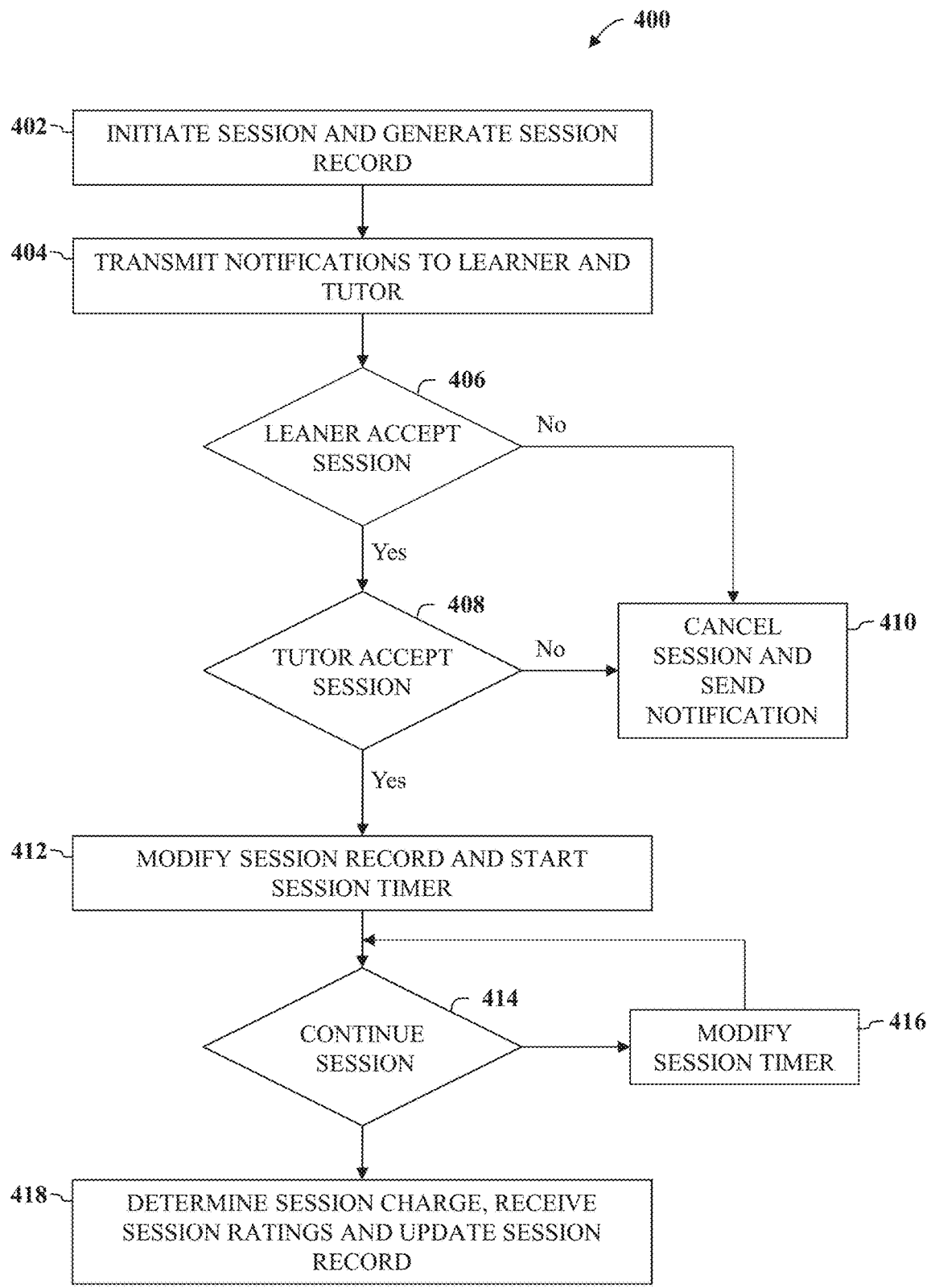

The session module 36 is configured to initiate, monitor, and manage tutoring sessions initiated between users and includes processor-executable instructions for executing the algorithm shown in FIG. 5 to initiate tutoring sessions (shown in FIGS. 18-25) that include communications between a tutor and a learner via mobile computing devices 20. In addition, the session module 36 includes processor-executable instructions for generating session data files 40 (shown in FIG. 8) including information associated with each initiated tutoring session. The profile module 38 is configured to generate user profiles and includes processor-executable instructions for executing a profile operation (shown in FIGS. 15-17 and 31-33) that allows users to generate user profile account data including tutor profile data files 42 (shown in FIG. 6) and learner profile data files 44 (shown in FIG. 7) that include information that is used by the messaging module 30, the GUI rendering module 32, the search module 34, and the session module 36 in performing the functions described herein. In one embodiment, the profile module 38 may include Heroku™ Php scripts to handle backend tokenization of users' sensitive data to and from Stripe™ $3^{rd}$ party servers 16.

The database server 22 includes processor that is coupled to a memory device that stores a database 44 to retrieve and store information that is used by the server system 12. The database 44 contains information on a variety of matters, such as, for example, user profiles, location data, user session data, financial data, mobile device identifies, and/or any suitable information that enables the system 10 to function as described herein.

In the illustrated embodiment, the database 44 includes a tutor profile data file 42 (shown in FIG. 7), a leaner profile data file 44 (shown in FIG. 7), and a session record data file 40 (shown in FIG. 8). The tutor profile data file 42 includes a plurality of tutor profile records 46 that are associated with tutors and include information that is generated by the profile module 38. For example, in one embodiment, each tutor profile record 46 may include information associated with a tutor including, but not limited to, a unique tutor ID, tutor profile information, tutoring subject category information, a tutor user's mobile phone number, tutor geographic location data, travel distance limit information, a tutoring rate, financial data, tutoring preference data, hourly rate, travel distance, location data, and mobile device ID. The tutor profile information may include user bio data such as, for example, name, email, photos, text descriptions.

The learner profile data file 44 includes a plurality of learner profile records 48 generated by the profile module 38. Each learner profile record 48 may include, for example, a unique learner ID, a learner user's mobile phone number, learner geographic location information, learner user data including name, email, photo, biographical descriptions, leaner preference data, hourly rate data, travel distance, location data, and a mobile device ID. In one embodiment, each learner profile record 48 may also include a plurality of unique tutor IDs indicating each tutor user that is connected with each corresponding learner user.

The session record data file 40 includes a plurality of session data records 50 that are generated by the session module 36 and includes information associated with each tutoring session that is executed by the system 10. Each session data records 50 may include a unique session ID, an tutor ID indicating the tutor involved in the tutoring session, a leaner ID indicating the learner involved in the tutoring session, duration data indicating an amount of time included in the tutoring session, an hourly rate associated with the tutoring session, a subject ID, and a tutor rating indicating a score provided by the learner associated with the tutoring session.

In one embodiment, User Bio Length: 280 Characters. User Password Min: 8 Characters. User Password Maximum: 24 Characters. Tutors have blue profiles, blue buttons, and are categorized as blue throughout the app. Learners have purple profiles, purple buttons, and care categorized as purple throughout the app.

Figure 37:

In the illustrated embodiment, the system 10 provides users with unique features including: allowing user scheduling up to 30 days in advanced and allowing user to book sessions in other areas through the interactive map (by searing a city or zip code) (shown in FIG. 37). In one embodiment, learners do not have usernames, and tutors do have usernames. Learners can share a tutor's username to their friends via SMS, email, etc. with an action button 52 located in a messaging system page 54 (shown in FIG. 30). Tutors can market themselves with their usernames on other platforms. Sessions can occur in person or through video call. A learner can leave a session anytime they would like. Tutors are warned for leaving sessions early and can be reported & punished for doing so. The system 10 includes a tutoring application with Social Media Connectivity & Up to Four Profile Pictures. The system 10 provides double side verification, in real-time for in-person tutoring sessions (shown in FIGS. 18-25). The system 10 includes an application that is essentially two applications in one, including a tutor profile and a learner profile, and all it takes is the tap of a single button to switch. Learners setup a credit or debit card while tutors setup a bank account. Tutors have blue profiles on the application, while learners are purple. The system 10 implements a search bar that is highly unique, allows users to type in any skill, subject, hobby, talent, or a city name/zip code—when a particular subject or skill, etc. is typed in, data arrives and shows how many tutors are teaching those things locally and globally. Sessions can be through video or in-person—both are facilitated through the application. Learners can navigate through the application very easily, message tutors, book sessions, and add tutors by username.

Tutor Registration & Main App. In the illustrated embodiment, the processor 24 is programmed to display a registration page 56 (shown in FIGS. 31-33) to enable both tutor users and learner users to register the exact same way, and this is through entering their mobile number or registering with Facebook Sign Up. If the server system 12 is able to pull a variety of information from Facebook, then the server system 12 can use that to cruise the user through registration—if not, the user manually enters all of their data into the server system 12. Either way, a user is required to enter their mobile number, first & last name, email, birthday, create a password, and then upload at least one photo. Once the initial registration is done, a user is then asked to accept or decline the QuickTutor non-discrimination policy and then select "Continue as Learner" or "Become a Tutor".

If a user declines the non-discrimination policy, they are redirected to the mobile site—a user is not able to use the app until they accept the non-discrimination policy.

When a user selects "Become a tutor" they are then taken to a frame (shown in FIGS. 34-36) where they can search through QuickTutor's thousands of subjects and add up to 20 to be able to teach upon registration—these subjects are then stored on their QuickTutor profile, which they can edit and rearrange at any time. A tutor can remove, add or substitute any subject at any time—but for the sake our search algorithm, platform quality, and tutor/learner ease—a limit of 20 subjects at a time may be set. The main app for the tutor is a view of their ratings, earnings, and policies, and their ability to change their policies and subjects at any time (shown in FIG. 16).

Figure 15:
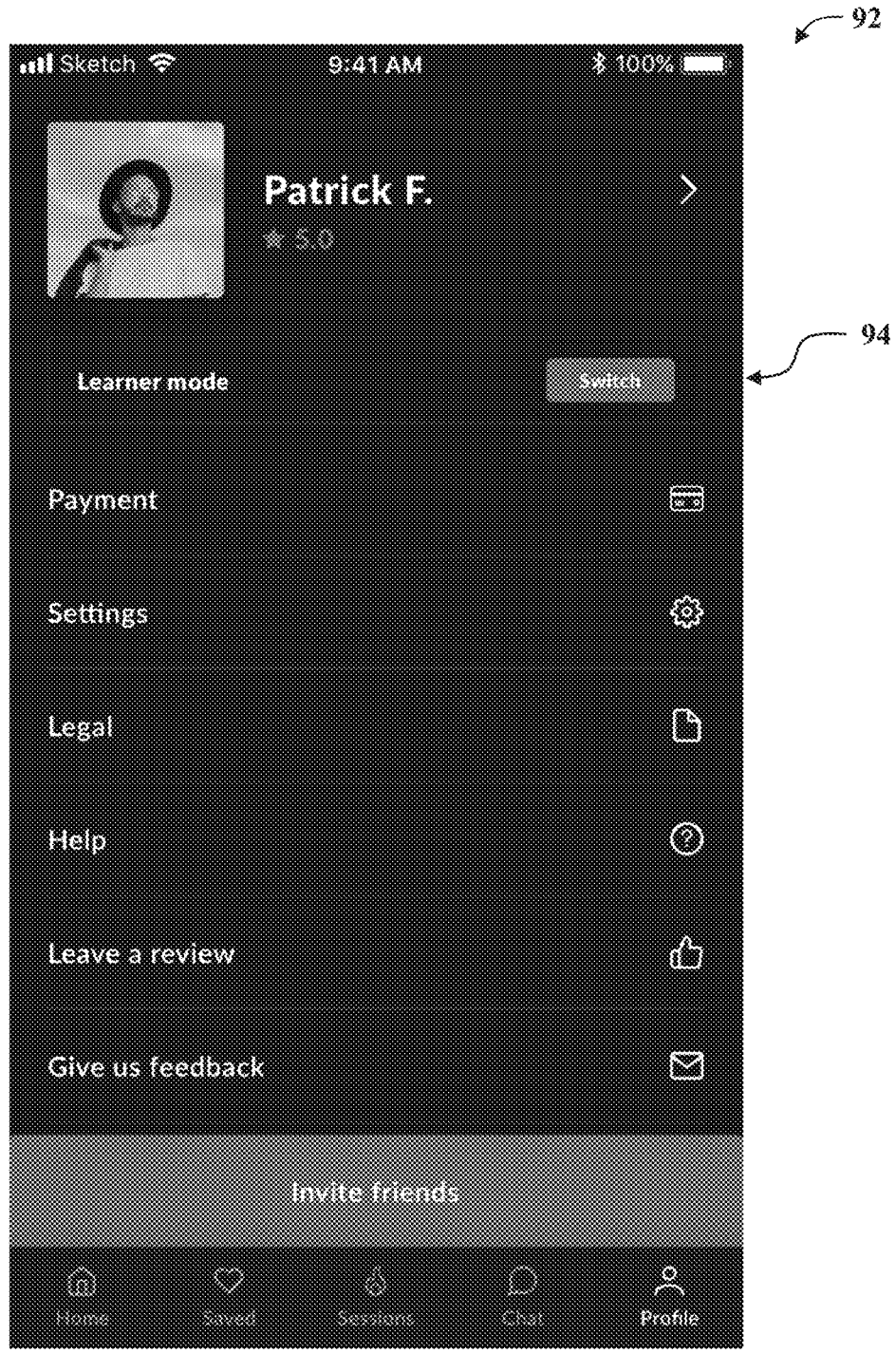
Figure 30:
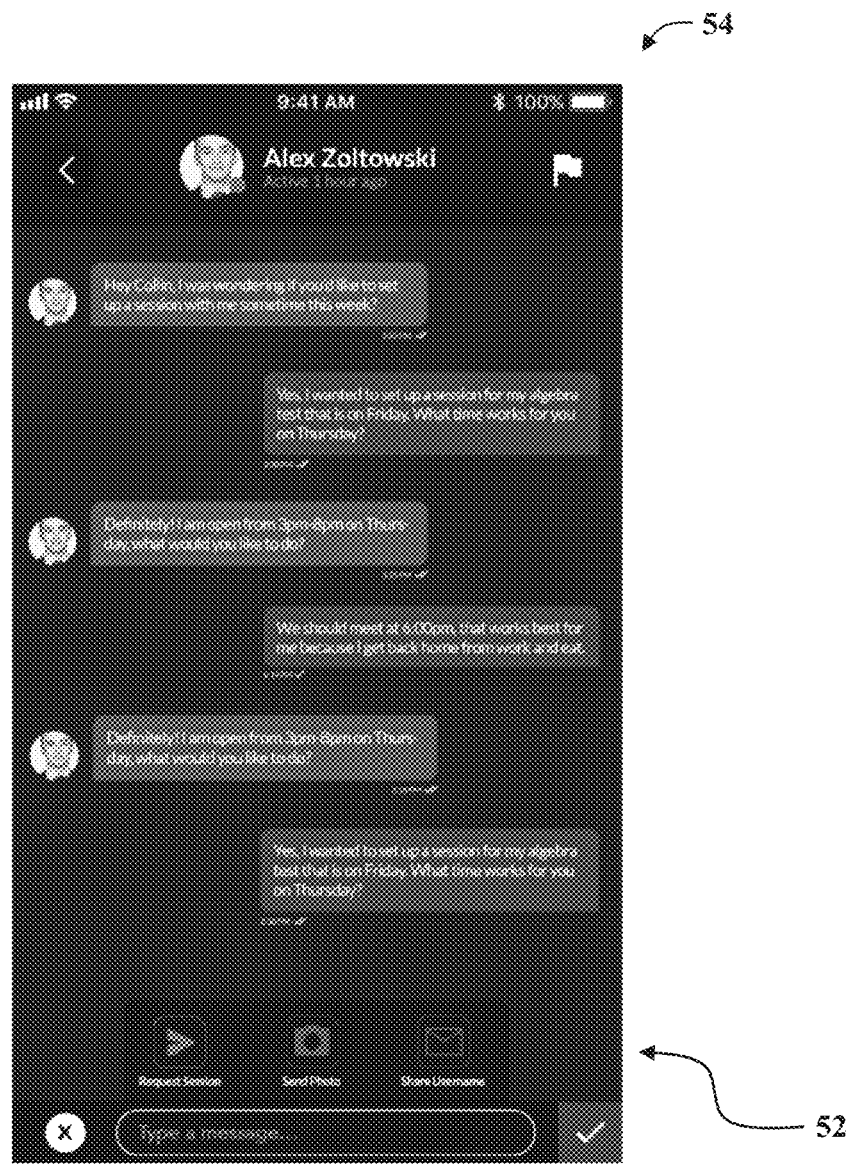

As shown in FIGS. 15 and 30, a tutor user and/or learner user can share QuickTutor through an invite message, go to their messages, message learners, and/or accept connection requests and session requests. Tutors are able to deny connection requests at their own discretion, cancel session requests (the CCP still may apply) and start video or in-person sessions early with learners if the learner accepts the early start and meets-up. Tutors and learners communicate with each other through the messaging system.

Figure 31:
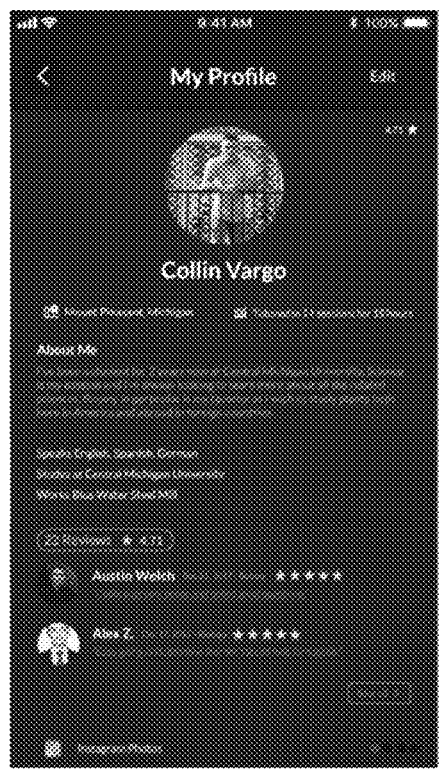
Figure 32:
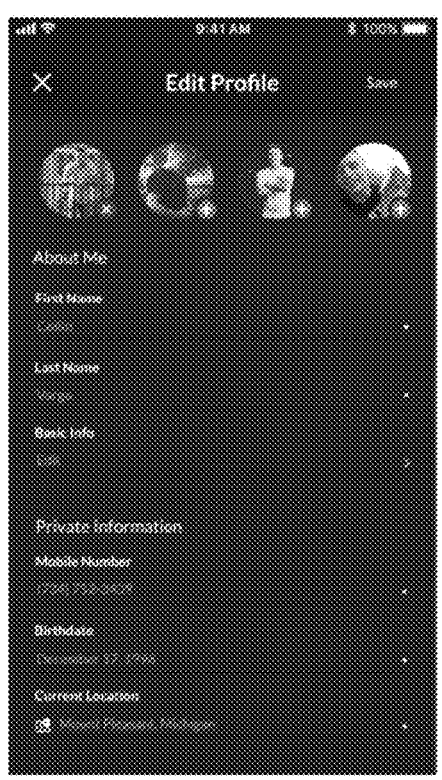
Figure 33:
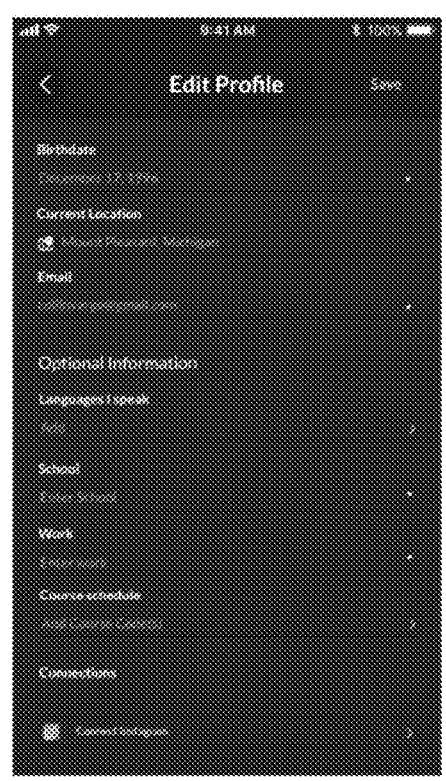
Figure 34:
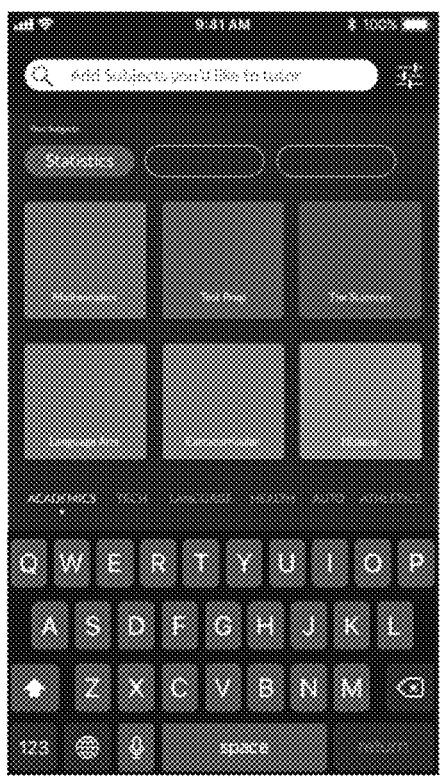
Figure 35:
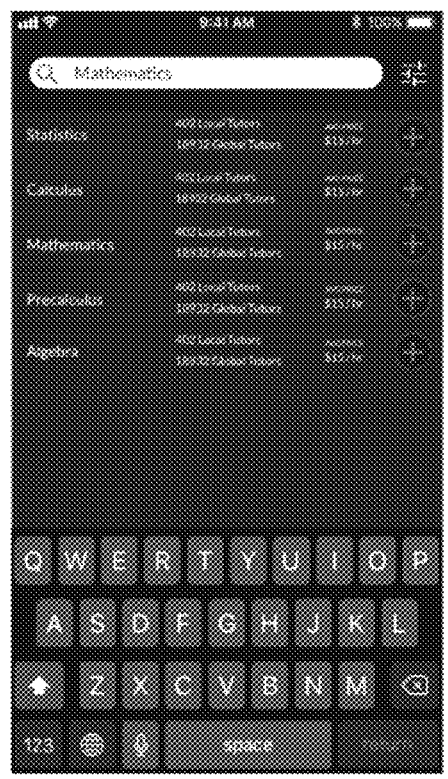
Figure 36:
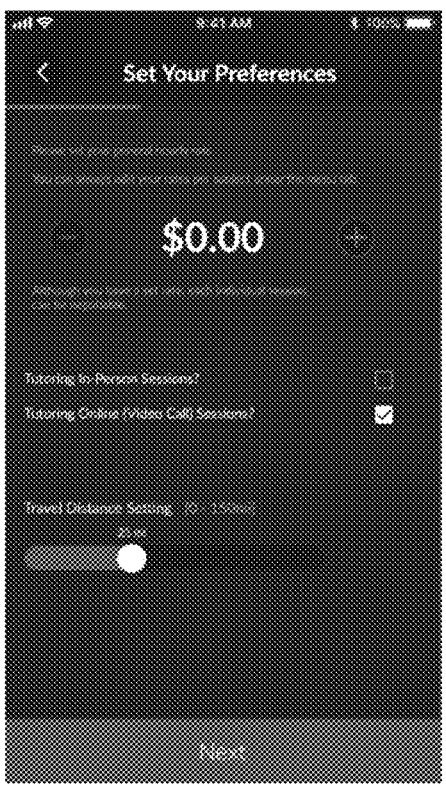

The tutor side of the system application is essentially the ultimate business management tool for tutors, whereas the learner side of the app is an ultimate service to learn anything Learner Registration & Main App. With reference to FIGS. 31-33, both tutors and learners register the exact same way, and this is through entering their mobile number or registering with Facebook Sign Up.

If the server system 12 is able to pull a variety of information from Facebook, then the server system 12 can use that to cruise the user through registration—if not, the user manually enters all of their data. Either way, a user is required to enter their mobile number, first & last name, email, birthday, create a password, and then upload at least one photo. Once the initial registration is done, a user is then asked to accept or decline the QuickTutor Non-Discrimination agreement and then select "Continue as Learner" or "Become a Tutor".

If a user declines the non-discrimination policy, they are redirected to the mobile site—a user is not able to use the app until they accept the non-discrimination policy.

When a user selects "Continue as Learner" they are then into the "Main App" which is where they can browse random tutors and subjects or search for a specific subject & attempt to connect with a tutor.

However, once they attempt to connect with a tutor for the first time, they are told that they have to fill out a payment method in order to do so, then really smoothly they can enter a debit or credit card number which is securely backed by Stripe API, and checks to see if the payment method is legitimate, etc.

Once the debit or credit card payment method is confirmed to be legitimate, the user is able to use the QuickTutor™ application however they'd like and connect with tutors, message, and setup sessions. The main app for the learner is a search bar up top, centered—where they can, "find a tutor for anything"—and then the navigation bar is to the left & the messaging system (tutors & sessions) is to the right (shown in FIG. 12).

Learners can browse through the feed of tutors from random places all over the country or use the search bar and find a tutor for exactly what they are looking for—so what the system is creating is a platform for the everyday learner who is curious to learn new things, anyone who wants to teach, and/or the person who needs a tutor/help right away 24/7 on-demand and can build that rolodex of people who are knowledgeable in their tutors tab. Whereas, the tutor side of the application is a business tool.

Figure 12:
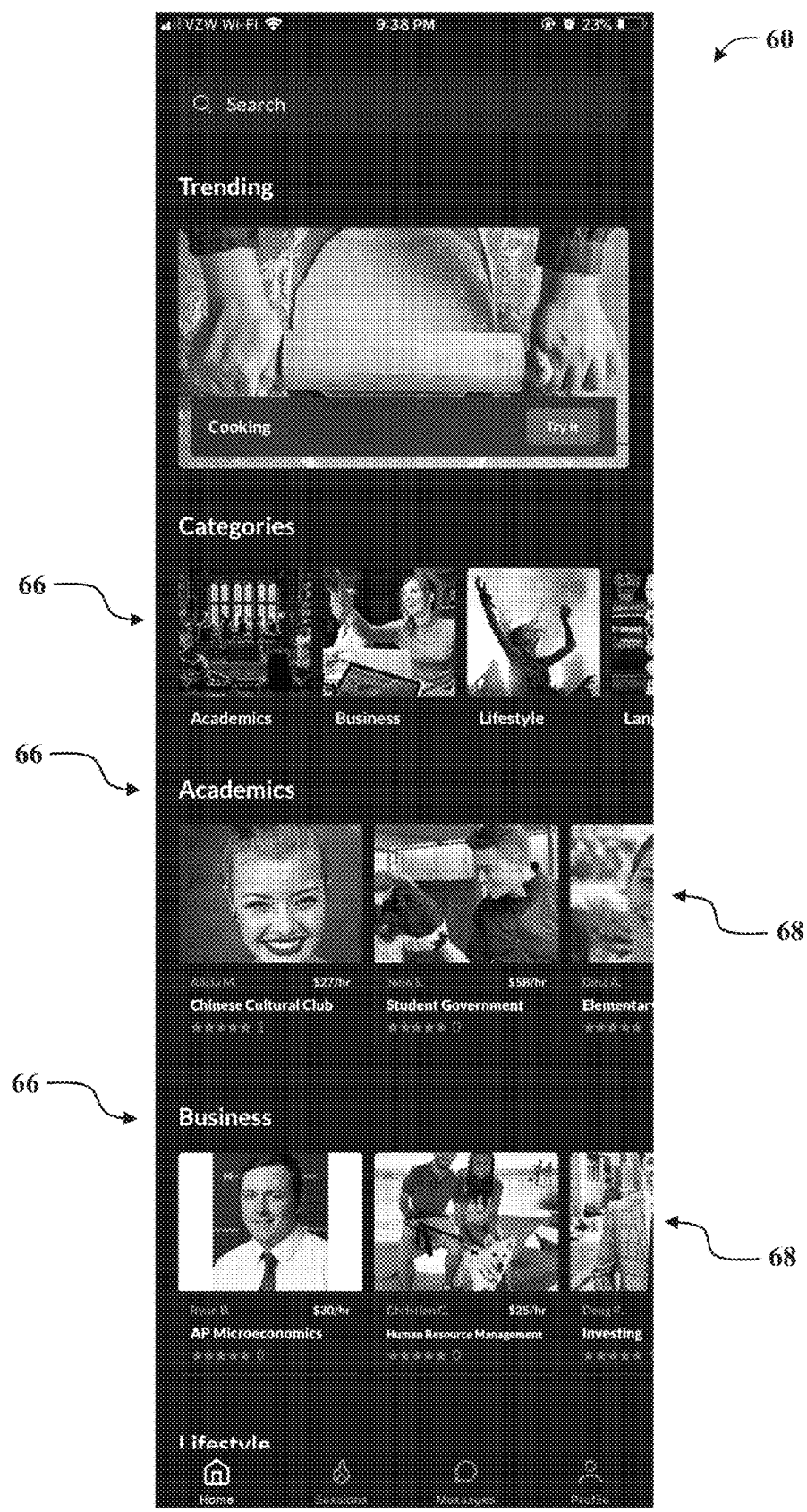

Referring to FIG. 12, the Navigation Bar Buttons for Learners may include: Profile—this is at the top of the navigation bar, essentially it allows a learner to look at their profile the way a tutor sees it, and allows them to edit their profile information like their name, bio, course codes, disconnect their Instagram™, etc. Payment—This allows users to add a payment method—debit or credit card payment. They can use this to pay tutors. QuickTutor runs through Stripe API for payments.

Settings—Three Sections (No Notifications for Learners): Community—Community Guidelines and User Safety—both hyper link the user to the mobile site; Account—Sign Out; Spread the Love—Give Feedback or Follow Us on Social Media Platforms; and Calendar—Sync your QuickTutor tutoring sessions with your apple or google calendar.

File Report—Allows user to report past sessions (nothing unique here). Reports can be based off of a tutor cancelling, being late, acting rude/unprofessional, harassing a learner, or other reasons.

Become a QuickTutor—becoming a QuickTutor allows a user to instantly begin building a tutor profile, enter their SSN, bank info and the subjects they'd like to teach so they can begin making money tutoring. With just the tap of a single button (located in the navigation bar).

Help—This contains a full rolodex of narrative written tutorials, including videos eventually, which will be much easier for the users. The written tutorials consist of accounts & payments, QuickTutor Guide, Filing Reports, Calendar, and Learner Handbook.

Legal—The legal tab takes the user to the mobile site, where they can read QuickTutor's Terms of Service, Privacy Policy, and Non-Discrimination Policy.

Figure 16:
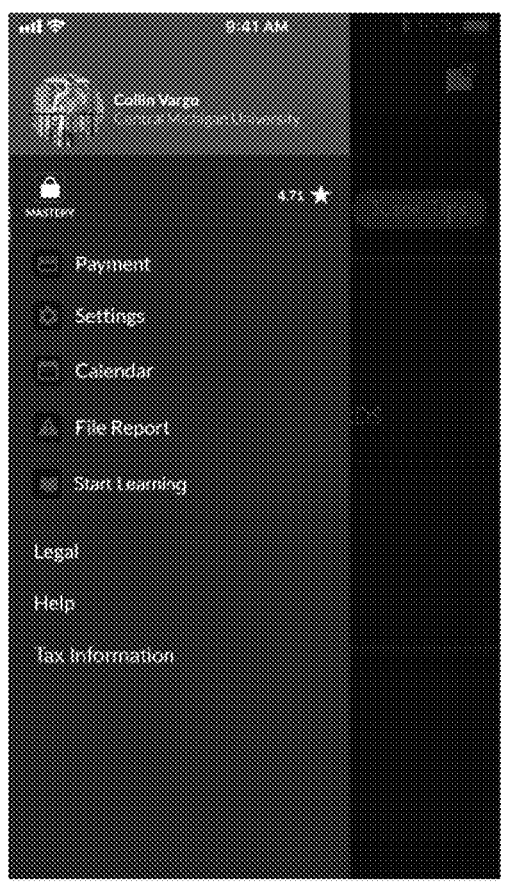
Figure 17:
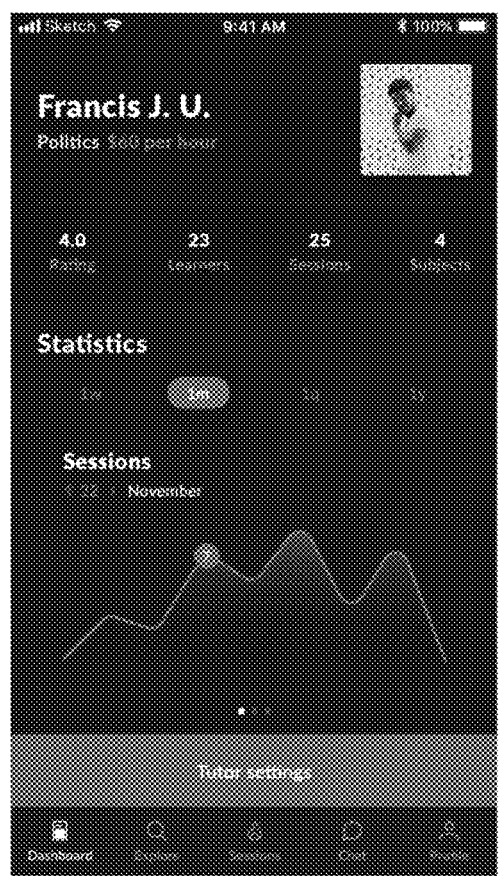
Figure 18:
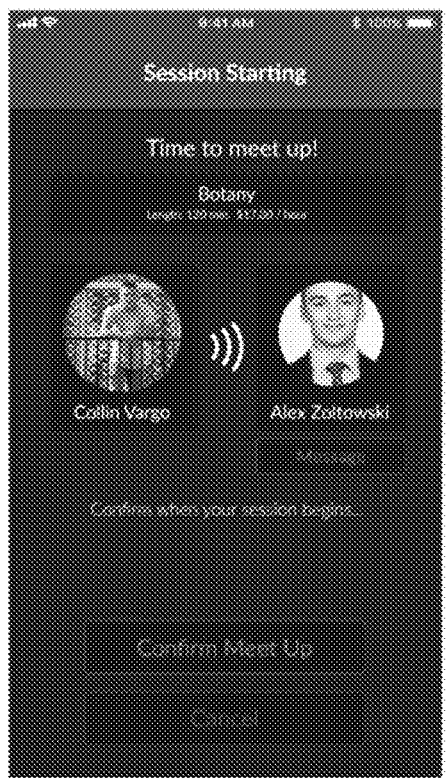

Referring to FIGS. 16-17, the Navigation Bar Buttons for Tutors includes: Payment—The ability to add a payment method (bank account). QuickTutor runs through Stripe API for Payment Methods, this is in place so that tutors can money tutoring.

Settings—Three Sections: Community—Community Guidelines and User Safety—both hyper ink the user to the mobile site; Account (ability to hide your account from Learners &/or sign out); Spread the Love—Rate us on the App Store, Follow Us (with Facebook, Instagram, twitter links); Calendar—with the tap of a button, the ability to sync tutoring sessions to iPhone's calendars.

File Report—Allows tutor to report past sessions (nothing unique here). Reports can be based off of a learner cancelling, being late, acting inappropriately, harassing a tutor or various other reasons.

Tax Information—this tab allows tutor's to give us their personal information (tax information): First & Last Name & Birthday, Street Address, City, State, and Zip code & then the user's SSN—this is all encrypted and securely transmitted using SSL and Stripe API—a highly secure storage for sensitive user information.

Start Learning—selecting this button for the first time enables the tutor to switch profiles and begin building a learner profile—in which they would then fill out a biography which describes what they are seeking for in a tutor and what they need help with->and then sends them over to the learner app.

Help—This contains a full rolodex of narrative written tutorials, and videos, which will be much easier for the users. The written tutorials consist of help in-regards-to accounts & payments, a QuickTutor Guide, filing reports, calendar, and a tutor handbook.

Legal—The legal tab takes the user to the mobile site, where they can read QuickTutor's Terms of Service, Privacy Policy, Non-Discrimination Policy, and any other legalities, licenses, or anything we may have upon the app launching.

Profiles: With reference to FIGS. 15-17 and 31-36, tutors are identified with blue profiles, learners are purple, the app has a dark black/dark grey design. Both users build profiles which consist of three main parts: About Me—First Name, Last Name, Personal Biography; Private information—Mobile Number, Email, and Specific Location; and Optional Information—Languages the person speaks, their School, their place of work.

Optional Information also enables the user the ability to connect Instagram—to display photos. Tutors can list up to 20 subjects that they can teach at a time. Both Users can also display their course codes and what university they completed them at. Tutors edit what's visible on their profile both in "Edit Profile" and "Tutor Menu".

Tutor My Profile/Edit Profile: Name; Mobile Number, Email, Password; Bio (About Me), Profile Picture(s) (Up To 4); Education History; Social Media Connectivity (Instagram for Photos); Current Place of Work; and Current/Former University.

Learner My Profile/Edit Profile: Name; Mobile Number, Email, Password; Bio (About Me), Profile Picture (Up to 4); Social Media Connectivity (Instagram & Facebook); Class Schedule (Course Codes); and Current/Former University.

All information is editable/changeable by the individual user. Required information includes: Name, Bio (at least 20 characters), and at least one profile picture.

The Process (connecting "tutors" and "learners").

Referring to FIGS. 17 and 34-36, in the illustrated embodiment, the server system 12 is programmed to enable Tutors to build up their account/profile by including the subjects they'd like to teach, a photo of themselves, a biography describing their field experience and expertise. Then, they are able to insert a number of optional information (if any) including their schedule, university course codes, cancellation policies, late fees, and social media connectivity etc. which helps learners/students/users make a decision whether they want to send a connection request to them. Learners build a profile, enter a debit or credit card payment method, and then have many options to find a tutor—they can browse vertically or horizontally through the QuickTutor home feed, which lists our twelve vast, but clear categories—represented by 12 unique graphically designed plaques (shown in FIG. 12). Learners can also use the search bar to search for one specific subject at a time (French cooking, baking, ASL, singing, dancing, football, etc.) and then receive a list of all the tutors that teach that specific subject—which is filtered by the learner's distance, price, and search the country (SEARCH FILTERS).

Therefore, learners can look for tutors based on how far a tutor is from them, what they charge, and if they are from their hometown/country/hemisphere. Learners can also use the search bar to activate the interactive map—which they can then search and find tutors in their area or in other cities and around the country.

Either through searching through the list of tutors that teach the subject they are looking for and fit their criteria or through searching specific locations (city name or zip code)—learners are then able to view a tutor's full profile and send them a connection request with the tap of a single button (tapping the "CONNECT" button—that request is sent through the messaging system and facilitated into the tutor's messages inbox, with a message. Both users can view each other's profiles, photos, profile details. Tutors can only accept or deny connection requests and cannot search for learners or send connection requests.

Once the connection goes through, then both users can message each other using the messaging module 30. The messaging module 30 implements a Messaging System (Tutors Tab for Learners, Learners Tab for Tutors). The Messaging System includes a completely Functional Messaging System. Learners send connection requests through the messaging system. Read Receipts for Both Users & "Delivered"—Marking a message was sent/delivered. Both Learner and Tutor can see each other's online status (normal). Both users get notified when a user sends a message to another user+the ability to turn off that notification. Tutor is notified when a Learner sends connection requests. Tutor is notified when a Learner sends a session request. Learner is notified when a connection request is accepted by a tutor (but not when one is denied). Learner is notified when a Tutor accepts or denies a session request. The messaging system orders messages by the most recent (all basic messaging system features—but built from scratch).

Three Unique Functions (LEARNERS), triggered by selecting an action button (plus symbol) to the left of the typing bar: Send Photos: Both Learner and Tutor can send photos in messenger; Share Username: Only Learners can share Tutors username (profile URL) via SMS/email, Facebook, Twitter, Slack, etc., etc.; and Request Session: Only learners can create a session request and send it to tutors.

TUTORS ACTION BUTTON—Tutors have a camera button to the left of where they type their messages, because they can only send messages back and forth to learners—they cannot send session requests or share a learner's username URL.

Learner Specifics ("Tutors Tab"—Messaging System): Learners can send connection requests to Tutors. Learners can send connection requests with manually typed in messages. Or Connection requests can be sent with a choice of three automated messages that sit above the keyboard. The verbiage of these three messages are as follows and in order from left to right above the keyboard: "Hello, I would like to connect with you."; "Hey! Let's connect!"; "Hey, I need your help ☺" (Smiley Face Emoji—iOS).

A learner cannot send another message to a tutor until the tutor accepts the connection request. When a connection request has been sent, the message tab will show that the connection is pending from the "Tutors" tab. Once a tutor accepts the connection request, both users are free to message each other. A learner can also send session requests to a tutor.

Figure 14:
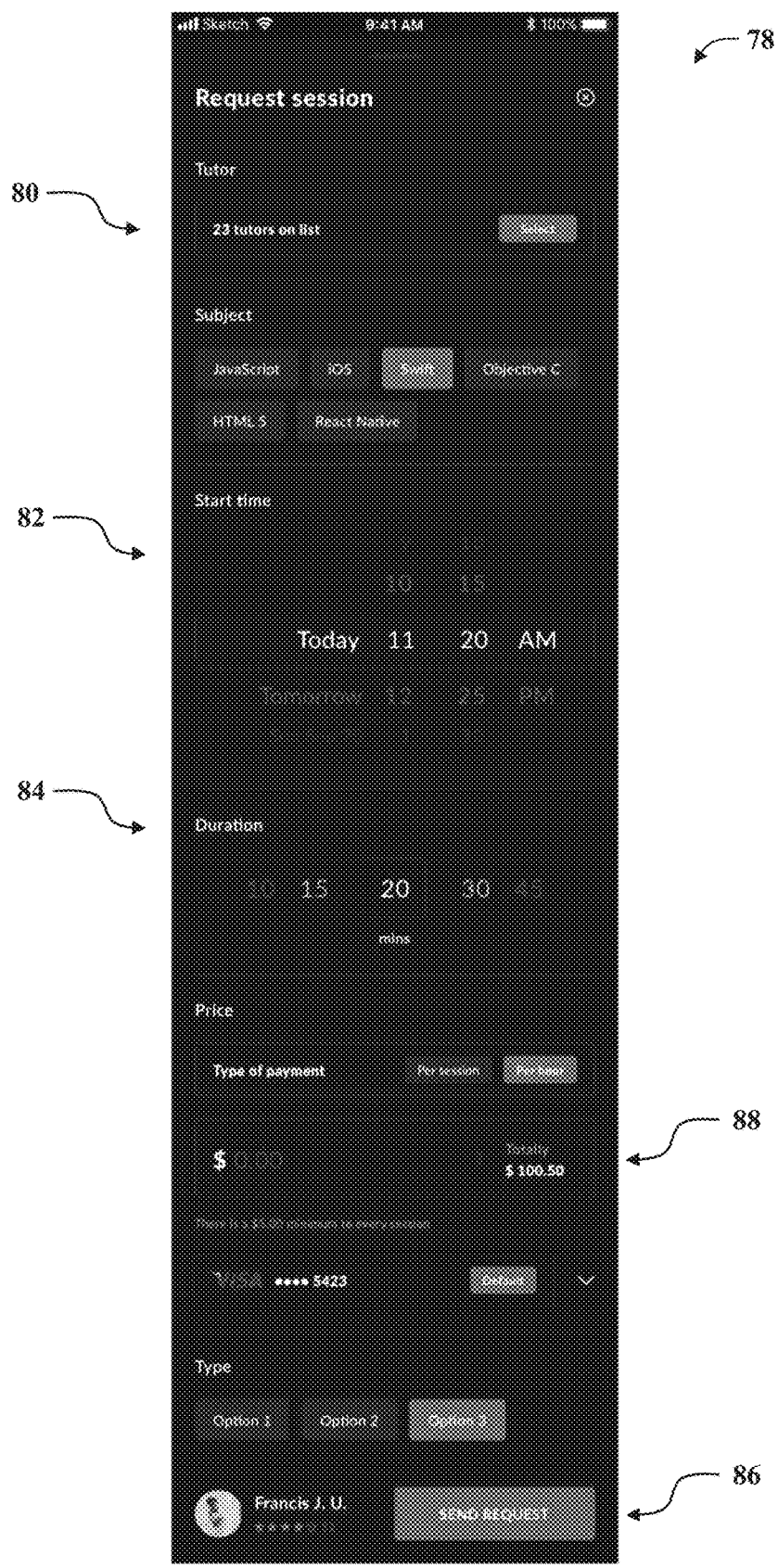

Referring to FIG. 14, Session Requests are sent by a learner with the five inputs required first: The subject; The session dates; Start Time & End Time; Price of the session; and A toggle between the choice of video call (online) or in-person. The earliest a session request can be sent is fifteen minutes in the future.

Tutors Specifics (Learners Tab—Messaging System): Tutors are a different kind of user with separate privileges. Tutors can accept or deny connection requests from Learners. Once a tutor accepts the connection request—they can message the learner at any time, vice versa. Tutors can accept or deny session requests from learners. Tutors cannot send connection requests through the messenger to learners—this is because tutors cannot search for learners, learners can only search and send connection requests to tutors. Tutors cannot send session requests through messenger to Learners—this is put in place, so tutors cannot pester learners. Learners communicate and send a session request if they want a session. Tutors can message and ask learners if they'd like to set up a session, but they cannot pester learners by sending them connection requests or session requests.

Last Details (some reiteration): The action button 52 (shown in FIG. 30) may include a plus sign, to the left of the keyboard and it pops up above the keyboard and typing field when selected and has three icons: 1. Request Session; 2. Send Photo; 3. Share Username. Connection requests expire from both user's inboxes after 7 days if not accepted or denied (responded to). The earliest a session request can be sent is 15 minutes in the future. Learner receives notification when tutor accepts connection requests. Learner does not receive notification when tutor denies connection requests. Learner receives notification when tutor accepts or denies session request. Tutors accept or deny connection requests and session requests with custom buttons that are in their messenger (a "check" or an "X").

Figure 13:
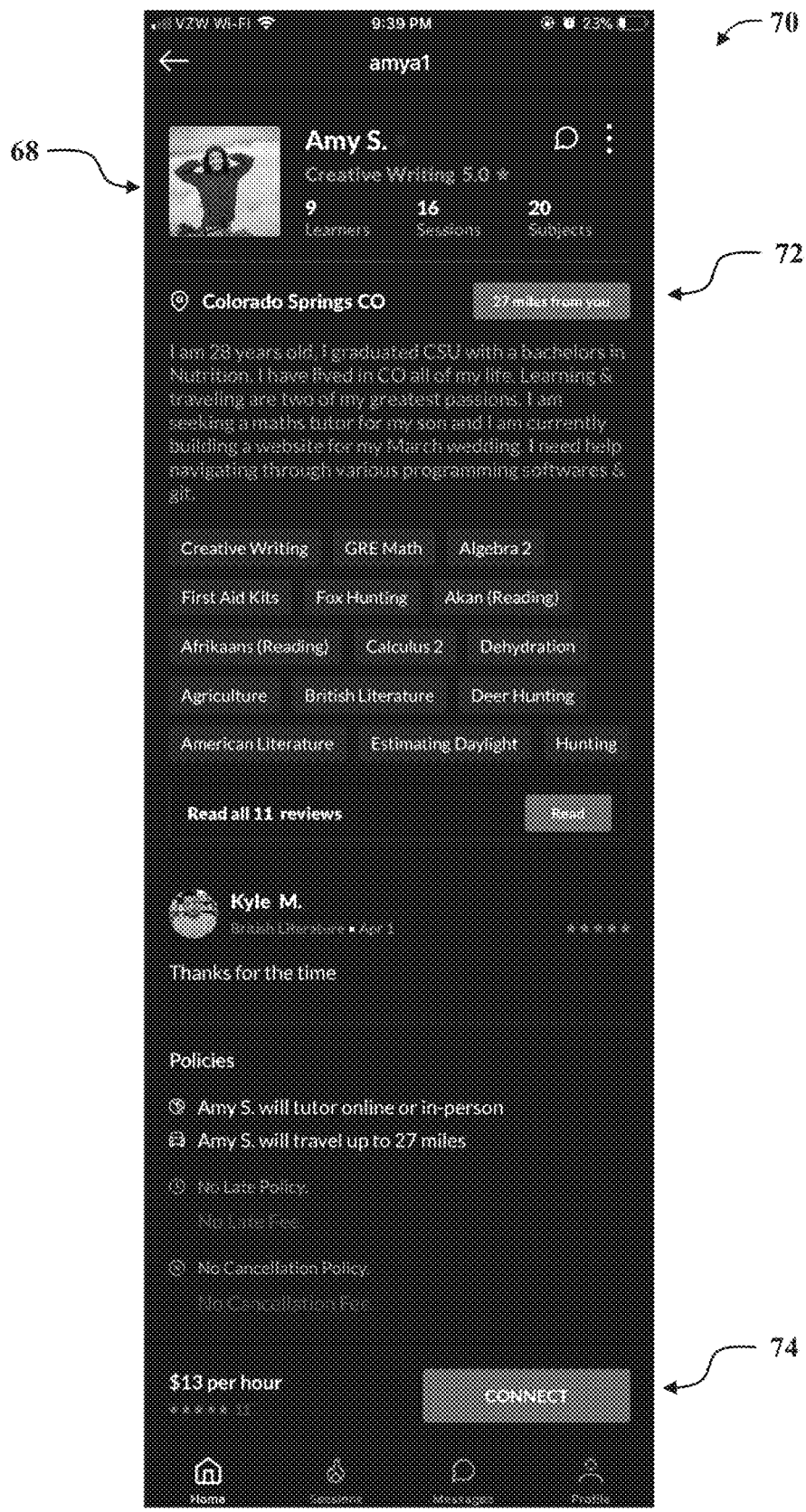

Sessions Tab (Scheduling/Scheduled Sessions). Referring to FIGS. 13 and 14, Session requests are sent through the messaging system by learners, which are distributed through the messaging system and into the tutor's "Requests" section in their sessions tab.

Both learners and tutors have an "Upcoming" and "Past" section in their sessions tab. However, tutors and learners both have a third section that differ from each other: A tutor's third tab is: Requests; A learner's third tab is: Pending Both learners and tutors can tap or swipe any of the sessions which are located in any of their three sections, which triggers action buttons.

"UPCOMING" ACTION BUTTONS (SAME FOR BOTH LEARNERS AND TUTORS). When an upcoming session is tapped or swiped on, the app triggers three buttons. 1) Start—which can attempt to manually start the session. 2) Message—which directs the tutor or learner to the messaging thread of the individual the session is scheduled with. 3) Cancel—when this button is selected, a pop-up occurs that asks the user if they are sure they want to cancel the session or not. If "cancel" is selected, the session is canceled. If "never mind" is selected, the module fades and the session is not canceled.

"PAST" ACTION BUTTONS (FOR LEARNERS): When a Past Session is tapped or swiped on by a learner, the app triggers three buttons: 1) View Profile—this takes them to that tutors' profile. 2) Message—this takes them to that tutor's message thread. 3) Request Session—this allows the user to request another session with the tutor and takes them to the schedule sessions module.

"PAST" ACTION BUTTONS (FOR TUTORS): When a Past Session is tapped or swiped on by a tutor, the app triggers two buttons: 1) View Profile—which takes them to that learners' profile. 2) Message—which directs the tutor to the messaging threat of the individual the session is scheduled with.

"REQUESTS" ACTION BUTTONS (FOR TUTORS): 1) Accept; 2) Deny.

"PENDING" ACTION BUTTONS (FOR LEARNERS): 1) Cancel

Manually Started Sessions: Referring to FIGS. 18-25, once a QuickTutor session is scheduled, users can manually start the session at any time via tapping on a session from the "Upcoming" section in the "Sessions" tab. When a user attempts to manually start a session, it will notify the other user. If the user on the receiving end of a manual start is outside the application, it sends them a push-notification, which when selected will take them to a session starting menu. If the user on the receiving end of a manual start is inside the application, it takes them to a session starting menu. Whether the session is video call or in-person, when the user enters the session starting menu—the receiving user will be asked to accept the manual start or deny it.

In-Person: If the session is in-person, when the user accepts the manual start, they are then taken to the next frame, where they must confirm the meet-up. In this frame, both users can message each other by tapping on the in-session messaging button. In-session messaging is highly unique to our process. This was created in order to provide users with messaging when traveling to a session, so they don't have to trade personal information like phone number or email. In-session menu messaging allows the users to message each other while their meeting up, if need be. The system provides a feature within here that allows them to share location, or drop a pin/select a meet-up spot through the messenger, which both users will then confirm.

If they deny the session starting early—it just notifies the other user that they don't want to start the session early.

Video Calling Tutoring Sessions: The recipient of the manual start for a video call tutoring session sees "NAME is video calling you . . . and has the option to accept the manual start or deny it. If the session is video-calling, when the user accepts the manual start, they are taken directly into the session.

Automatically Started: When it comes time for the scheduled session to begin, it simply begins.

In-Person: If the users are outside the app, they will both receive push notifications, which when tapped on—will take them to the session starting menu. If the users are inside the app, they are automatically taken into the session starting menu. Once both users are in the session starting menu, they are asked to confirm the meet-up. When both users confirm the meet-up (QuickTutor will pull both users geolocations for reporting and data purposes) and the session will begin. Both users can message each other from this frame. If they cancel the session—the user that cancels gets notified they may be penalized if the tutor or learner reports them. The person who gets cancelled on is notified that the session has been canceled by the other person.

Video Call Tutoring Session: When it comes for the scheduled session to begin, it simply begins. If a user is outside the application, they will receive a push notification, which when tapped on will take them to video calling the other user. If a user is inside the application, they will automatically be taken into video calling the other user.

Custom Cancellation Policy: The custom cancellation policy was engineered/invented by QuickTutor, LLC and is an original concept. Tutors are able to build/create their own cancellation policies in automated form, not narrative (within our guidelines).

Example: 1) Cancel prior to X hours or be subject a $X.XX fee. 2) A learner can be no later than X minutes. Late Fee: $X.XX.

Tutors must accept a session request within the half-life of the scheduled session time, or the session request will expire—disappearing from the "Requests" section of their sessions tab, and being listed as "EXPIRED" in the messaging system.

Both learners and tutors can file a cancellation or late report on each other. Cancellation fees and late fees are not automated, they only occur when one user goes into the navigation bar and selects, "File Report"—this is because sometimes there will be reschedules—and the tutor or learner may be perfectly fine with a cancellation or their counterpart being a bit late in a particular situation. This gives freedom and power to the users, but with some guidelines.

Cancellations must be filed no earlier than 30 minutes before the scheduled end of a session and cannot be filed more than 7 days after the date of the scheduled session. All cancellations and late fees are subject to a 3% QuickTutor Service Fee.

Tutors must obey their own cancellation policy—will receive a strike if they disobey their cancellation policy or late policy.

REPORTING SYSTEM: Referring to FIGS. 26-29, Tutors and learners can both report each other for a number of reasons—and there are two reporting systems on QuickTutor.

MESSAGING SYSTEM REPORTING SYSTEM: When a user reports another user through the messaging system they can report them for four possible things: Inappropriate Messages; Inappropriate Photos; Harassment; Fake Profile.

FILING REPORTS REGARDING SESSIONS: When a user reports another user through the session reporting system, they can report them for a number of things: Cancelling; Being late; Being Unprofessional; Harassment; Other. The keynote frames: "File Report" provide detail.

PAYMENTS AND PAYMENT PROCESS: Upon attempting to connect with a tutor on QuickTutor for the first time, a learner is required to enter their debit or credit card information to pay for tutoring sessions. Upon becoming a tutor on QuickTutor, a tutor is required to enter their SSN and Bank Account Information (Routing and Account Numbers) which are linked to STRIPE API.

TECHNICAL STACK: Facebook API—For signing in users and collecting public user data. Instagram API—Collecting public user data, mostly images. Stripe API—Charge users for their tutoring fees, pay tutors, check for fraud, get analysis of each customer's spending, keep financial analysis of how much tutors have made via QuickTutor, check credit card/bank account validity, check for successful funds transfers, user wallet, control payouts to users, generate tokens to store sensitive user data, and transfer money back and forth between users for confirmed cancellation and late fees. Twilio API—allowing users to video call each other for online tutoring sessions. Firebase—Store user data, name, address, geolocation, subjects, analytics, payments, hours taught, messages amongst other users, check online presence. Overall user data needed for in app functions. FireChat—FireChat is what we'll be using through Firebase—it is a very fast messaging API that operates through Google Firebase. Heroku—Php scripts to handle backend tokenization of users' sensitive data to and from stripe. Snapkit API—Open source library used for controlling the placement of views and images on a screen.

How We Do Our Search: This is our stack+how search works: Search—Uses the current user's latitude and longitude to create a Geohash (not unique) to query through Firebase and find users in close proximity efficiently. Firebase will hold user unique identifiers in a parent node called "GeoLocation" which it will search through with a specific prefix depending on a user's Geohash. This will allow the search to be optimized for real time functionality. Tutors that fit the distance criteria are chosen and downloaded to the client's phone. The matchmaking algorithm will go through the list of queried tutors and give each of them a rating based on how well they fit the users search criteria. After every tutor is given a rating we sort the list of tutors by highest rating and then display them to the user in that order.

Tutor App Specifics. Referring to FIGS. 16-17, Tutor Menu: This is where tutors can edit everything—The subjects they tutor, their preferences, policies, availability, and courses completed.

Trending (Tutor App): This is a visual tutor reference tool which contains art of the twelve categories & three QuickTutor statistics: 1. QuickTutor Sessions; 2. The total active QuickTutors; 3. The overall average tutoring hourly price. When a particular category is selected—a brief description, and statistics regarding that category, including industry averages and how many tutors are tutoring in that particular category.

Tutor Tips: This is verbal description and tutorial of how to get more connection requests, use the app, etc.

Tutor Leaderboards—The tutor leaderboards tab is a ranking system of all the tutors in the world. This rating algorithm is based upon how many five stars a tutor receives, how many sessions they've had, and how many hours they've tutored. The tab shows the top ten tutors in the world within each category, and also shows the tutor their rank, how many hours they've tutored, their number of sessions, and number of 5 star ratings.

Ratings Tab—the ratings tab shows a tutor how many sessions they've had, how many five stars they've received and how many hours they've tutored. As well as their rating, top subject they tutor, and then their reviews are also found here. There are able to see all of their reviews here.

Earnings Tab—In the earnings tab, tutors can see this week's earnings and their all-time earnings, as well as how much money they made on every individual day of the week.

Viewing Other's Profiles: Tutor Viewing a Learner Profile (What's Visible): Name, Location, Distance Away. Bio (About Me), Profile Picture (Up to 4). Ratings & Reviews. Sessions & Hours (Stats). Social Media Connectivity. Class Schedule (Course Codes). Work. Languages they speak. University.

Learner Viewing a Tutor Profile (What's Visible): Name, Location, Distance Away. Bio (About Me), Profile Picture (Up to 4). Ratings & Reviews. Hourly Charge. Sessions & Hours (Stats). University. Languages they speak. Work. Preferences (Hourly Charge, Travel Preference, and Online Preference). Policies (CCP and Late Policy). General Availability. Courses Completed. Social Media Connectivity.

Biography Maximum: 280 Characters (Both Users). Biography Minimum: 20 Characters (Both Users). Review Maximum: 500 Characters (Both Users). Review Minimum: 20 Characters (Both Users). Password Minimum: 8 Characters PUSH NOTIFICATIONS (Learner): New Connections: "_____ accepted your connection request."; Messages: "_____ messaged you, don't leave em' hanging."; Session Request Accepted: "_____ accepted your session request."; Session Begins Soon: "Your session starts in five minutes, go grab yourself a cup of coffee (Coffee Emoji+Flame Emoji)."; Session Cancelled: "Your session with_____ has been canceled."

PUSH NOTIFICATIONS (Tutors): Receives Connection Request: "_____ would like to connect with you."; Receives Message: "_____ messaged you, don't leave 'em hanging."; Receives Session Request: "_____ would like to have a session."; Session Begins Soon: "Your session starts in five minutes, go grab yourself a cup of coffee (Coffee Emoji+Flame Emoji)."; Session Cancellation: "Your session with _____ has been canceled."

More Verbiage: "Class Schedule is an optional feature for students."; Subject Selection (for tutors)—"Please only select subjects you are proficient in."; "Choose a maximum of up to 20 different subjects, but you can change+rearrange them at any time."; "_____ would like to connect with you (added you by username).".

If the user doesn't have a university, the processor 24 will show their location that the system pulls. However, if the user has a university inserted into the application, then the university will override the location and be in the profile snapshot.

The system includes a database of Languages in the files. This is not languages QuickTutor will be in, this is simply allowing users to display what languages they know on their QuickTutor Profile. The display names of the languages are not actually what they will be displayed as on the profile, it is just for the respect of the users. It's a very honorable thing to do.

Connecting with a Tutor (Send Connection Request—Message) A learner cannot actually message a tutor until they send a connection request. Connection request sent—pending. A learner cannot actually message a tutor until they send a connection request. Which they have three messages to choose from.

FIG. 30 illustrates the Messaging a tutor, Action button: Request Session, Send Photo, and Share URL. When logged in as a tutor, the processor 24 will not display tutors with a "Request Session" Button anywhere on their app. A maximum of five languages is insertable. These are learner reviews, not tutor reviews—but they are the same thing. Class schedule will be horizontally scrollable. Learners can manually add their class codes from "My Profile" (the first time)—then after the first time, they must go to "Edit Profile" in order to change their class schedule. A dot indicates that the data is editable within this frame, and the user won't be taken away. When "first name" or "last name" is selected/tapped on—Keyboard pops up. Current location & birthdate are not editable. When languages is selected, it takes the user to another frame. When "Add Course Codes" is selected it takes a user to Keynote. When "Connect Instagram" is selected—it takes the user to those respective APIs.

Referring to FIGS. 18-25, the system 10 is configured to initiate video calls to connect tutor users to learner users during tutoring sessions. For example, Video Call—NORMAL (Occurs when Manual or Auto) goes into their sessions tab, and selects "Start" OR a video session automatically starts—user is in the app. If it is automatically started, this will only be the frame until the tutor gets to the same spot as the learner. Then the session will begin.

Video Call—Tutor Manually Starts (Receiving Video Call) into their sessions tab, and selects "Start"—and manually starts the session. If a learner taps on "Accept Manual Start"—the session begins instantly. If a learner taps on "Cancel" the session is rejected. Learners cannot be penalized for rejecting a manual start.

In-Person—Learner Manually Starts. This frame occurs when a tutor goes into their sessions tab and manually starts an in-person session. The tutor must then accept the manual start. Then, the learner can message and/or confirm meet-up on keynote slide #5. Again, this frame is for an-person session. Therefore, the session will not begin when the tutor accepts the manual start, but when the tutor accepts the manual start and then both users confirm meet-up.

In-Person—Tutor Manually Starts goes into their sessions tab and manually starts an in-person session. The learner must then accept the manual start, as depicted here. Then, the learner can message and/or confirm meet-up on the next keynote slide—#5. Again, this frame is for an-person session. Therefore, the session will not begin when the learner accepts the manual start, but when the learner accepts the manual start and then both users confirm meet-up.

In-Person—Session Starting (Session Menu). This in-person frame can occur in 3 ways: 1. When a tutor manually starts and the learner accepts the manual start. 2. When a learner manually starts and the tutor accepts the manual start. 3. When the session automatically starts.

Session Starting (After learner confirms meet-up). This frame occurs when the learner confirms the meet-up but the tutor has not yet confirmed the meet-up.

Video Call Session, Session In Progress. This frame occurs when a video call session is in progress. Whether the session is started automatically or manually does not matter.

In-Person Session—In Progress. This frame occurs when an in-person tutoring session is in progress. This happens when the session was started either automatically or manually, doesn't matter.

End Session (In-Person). This frame occurs when "End Session" is selected at the bottom of the screen. This is the end session module for an in-person tutoring session.

End Session. This frame occurs when "End Session" is selected at the bottom of the screen. This is the end session module for a video tutoring session.

End Session or Keep Going? (In-Person Session). This frame occurs when the time is up in a tutoring session. The learner is asked if they would like to end the session or keep going. A tutor is never asked if they want to end session or keep going. They are in a hold-menu while the learner is seeing this. This is the keep going or end session module for an in-person session.

End Session or Keep Going? Video Session. This frame occurs when the time is up in a tutoring session. The learner is asked if they would like to end the session or keep going. A tutor is never asked if they want to end session or keep going. They are in a hold-menu while the learner is seeing this. This is the keep going or end session module for a video tutoring session.

Keep Going—Video Session (Add Time). This is the frame that occurs when a learner selects "Keep Going" They then can add time to the session. Once the learner taps "ok"—the time addition request is sent to the learner. A tutor must accept the time addition, in order for the session to keep going. Both users can hear each other while the learner is adding time, this is audio, but the video is paused in the background as viewed here.

Session Paused (Video Session) Tutor Pauses the Session. This is when a session is paused. Both tutors and learners can pause sessions at any time, when a session is paused, the other person can still end the session.

Session Paused (Video Session) You (learner) pauses the Session. This is when a session is paused. Both tutors and learners can pause sessions at any time, when a session is paused, the other person can still end the session.

Video Call—NORMAL (Occurs when Manual or Auto). This frame occurs when a tutor goes into their sessions tab, and selects "Start" OR when a video session automatically starts—user is in the app. If it is automatically started, this will only by the frame until the learner gets to the same location as the tutor (this frame). Then the session will begin.

Video Call—Learner Manually Starts (Receiving Video Call). This frame occurs when a learner goes into their sessions tab, and selects "Start"—and manually starts the session. If a tutor taps on "Accept Manual Start"—the session begins instantly. If a tutor taps on "Cancel"—the session is rejected. Tutors cannot be penalized for rejecting a manual start.

In-Person—Tutor Manually Starts. This frame occurs when a tutor goes into their sessions tab and manually starts an in-person session. The learner must then accept the manual start. Then, the tutor and learner can then message and/or confirm meet-up on keynote slide #5. Again, this frame is for an-person session. Therefore, the session will not begin when the learner accepts the manual start, but when the learner accepts the manual start and then both users confirm meet-up.

In-Person—Learner Manually Starts. This frame occurs when a learner goes into their sessions tab and manually starts an in-person session. The tutor must then accept the manual start, as depicted here. Then, the tutor can message and/or confirm meet-up on the next keynote slide—#5. Again, this frame is for an-person session. Therefore, the session will not begin when the tutor accepts the manual start, but when the tutor accepts the manual start and then both users confirm meet-up.

In-Person—Session Starting (Session Menu). This in-person frame can occur in 3 ways: 1. When a learner manually starts and the tutor accepts the manual start. 2. When a tutor manually starts and the learner accepts the manual start. 3. When the session automatically starts.

Session Starting (After tutor confirms meet-up). This frame occurs when the tutor confirms the meet-up but the learner has not yet confirmed the meet-up.

Video Call Session In Progress. This frame occurs when a video call session is in progress. Whether the session is started automatically or manually does not matter.

In-Person Session—In Progress. This frame occurs when an in-person tutoring session is in progress. This happens when the session was started either automatically or manually, doesn't matter.

End Session (In-Person). This frame occurs when "End Session" is selected at the bottom of the screen. This is the end session module for an in-person tutoring session.

This frame occurs when "End Session" is selected at the bottom of the screen. This is the end session module for a video tutoring session.

Session Paused (Video Session) Tutor Pauses the Session. This is when a session is paused. Both tutors and learners can pause sessions at any time, when a session is paused, the other person can still end the session.

Session Paused (Video Session). You (learner) pauses the Session. This is when a session is paused. Both tutors and learners can pause sessions at any time, when session is paused, the other person can still end the session.

Referring to FIG. 16, in one embodiment, the processor displays a navigation bar for tutors. It is the same as learner, just blue and has tax information at the bottom. Tapping that button "Start Learning"—takes the user to the Tutor-to-learner crossover page. Similar to the learner-to-tutor crossover page.

Optional Intro Video/Audio—Tutor Dashboard+Tutor Card: Tutors record videos or audio on their tutor dashboard and then upload them to their profile for learners to view. These audio and video recordings are meant to make the learner more comfortable and entice a session.

Background Checks: Checkrr API (On Tutor Dashboard): Tutors file for background checks, and once approved, a violet lock icon appears on their profiles to indicate to learners that they are "background check approved."

Tutors can add FAQ Documents/Sections to their profiles: Tutors can create custom FAQ documents in their tutor dashboard and upload them to their profiles for learners to view in case learners have any questions about hourly rate negotiation, style of tutoring, the tutor's rules, personal preferences, preferred tutoring location, hours of tutoring, etc. Tutors will be able to connect with other tutors and chat through messaging & forums. Learners will be able to connect with other learners and chat through messaging & forums.

Group Bookings & Group Sessions—2-50,000 learners can schedule a group session with a single tutor. In-person, session limit is 200 participants, per tutor. There can be as many tutors in an in-person session as the tutors want.

Tutor & Learner Forums—where tutors chat with tutors, discuss strategies, FAQ, etc. Where learners chat with learners, discuss strategies, etc.

QuickCalls—Tutors can set a price for a "QuickCall" and have an "available" button on their tutor dashboard for QuickCalls. A learner taps on a "call" button on the tutor's profile, they then select a subject from a modal menu & the call initiates. It operates very similar to a video call session but doesn't need to be scheduled. The money deposits into the tutor's bank account after the QuickCall just like a session and learners leave tutor's a QuickCall rating & review. A QuickCall can last however long the users want until one hangs up. It's like speed dial for a world of experts.

Tutor Scheduling Fee—A tutor should be able to set a scheduling fee within their preferences section where they can set their price, etc. Essentially, a scheduling fee is the fee a learner must pay before scheduling a session with a tutor. The Apple thumbprint modal will appear at the bottom of the screen and require a learner to pay a specific scheduling fee . . . just to schedule with the tutor. Once the tutor accepts the session request, then the payment goes through on the scheduling fee. The payment doesn't go through when they send the session request, but it requires the learner to consent on the scheduling fee by using their thumbprint.

Price Per Subject—Tutors will have an option to set a price per each subject they teach. The price pops-up when a learner taps and holds down on the tutor's subject.

Quick Questions—Learners can propose questions through the messaging system. A tutor can accept the request from the learner & then get paid. Tutors must provide an answer within a certain timeline provided from learner to tutor, in order to get paid. When the tutor submits the answer, the learner has to approve, and then the tutor gets paid. The learner cannot get a refund. The learner must give the tutor a question rating after every QuickQuestion.

Parent/Guardian Account with Kids App—Google Maps API. GPS so the parent can track the kid's location while at in-person sessions. Parent Controls. For Kids Under 16. Specific buttons & features for users under 18. Unsafe Button—that alerts five phone contacts of parent's choice+ the parent/guardian account attached to the child account. Parent accounts pair with kid's profiles so parents can effortlessly manage all of their tutoring sessions, payments, etc.

Interactive Virtual Flashcards: being able to create, interact, change font, text type, color, etc. 360 view flashcards flip through the designs, share them via text, send them to friends, and sell them on their profiles.

Tutor Leaderboards: Tutor rankings based on all 12 unique categories on QuickTutor. All tutors are included on leaderboards. Tutors can only view, learners cannot view.

Courses: Tutors can upload video courses through their video manager (9,000+ subjects, topics, and ideas . . . everything and anything available on the app) on their tutor dashboard and upload their videos to their profile and the main learner video feed (similar to YouTube™). The uniqueness comes in execution & monetization. Tutors upload videos and have to fit them into a particular category, subcategory, and subject offered on QuickTutor—they can sell their videos for a specific price, sell their videos for a specific price and monetize them with ads, just monetize them with ads, or just upload them for free. Videos will display views, purchases, and ratings & reviews for both learners & tutors. Free and monetized with ads videos will be viewable for all learners. Learners will have to purchase videos that tutors sell for a specific price. Moreover, QuickTutor premium will be enabled for learners to be able to gain access to all video content for free. QT Premium~monthly subscription service (Student & Veterans)—Learners can access to all videos for free, for just $x.xx/month. Rating required after viewing (quick modal) review not required.

FIGS. 3-5 are flowcharts of methods 200, 300, and 400 that may be executed by the server system 12 to executing tutoring sessions between users via mobile computing devices 20. The methods include a plurality of steps. Each method step may be performed independently of, or in combination with, other method steps. Portions of the methods may be performed by any one of, or any combination of, the components of the system 10. FIGS. 10-37 are exemplary graphical displays that may be displayed by the system 10.

In the illustrated embodiment, FIG. 3 illustrates the algorithm 200 that may be executed by the server system processor 24 to perform a search function to display information to a user. In method step 202, the processor 24 displays a tutoring subject search page 60 (shown in FIG. 12) on a mobile computing device 20 and receives a search request from a learner user via the mobile computing device 20. The search request may include information associated with a tutoring subject. For example, in one embodiment, the processor 24 receives a launch request from a first mobile computing device 62 that is associated with the learner user to launch a tutor search application on the first mobile computing device 62. For example, the processor 24 may receive a signal from the first mobile computing device 62 indicating that the learner user has selected an application icon associated with the tutor search application being displayed on a home screen on the first mobile computing device. Upon receiving the launch request from the first mobile computing device, the processor 24 displays a tutoring subject search page 60 on the first mobile computing device 62. The processor 24 then executes method steps 204-206 to display the tutoring subject search page 60 on the first mobile computing device 62.

For example, in method step 204, the processor 24 receives a mobile device ID and accesses the learner data profile 44 to retrieves a learner profile record based on the received mobile device ID. For example, in one embodiment, the application server 21 receives a phone number or internet IP address associated with the mobile computing device and retrieves the learner data record making a matching mobile device ID. The processor 24 receives GPS data from the mobile computing device 20 and determines the geographic location of the learner using the mobile device GPS data. In another embodiment, the processor 24 may determine a location of the learner using address information contained in the retrieved leaner profile record.

In one embodiment, upon receiving the launch request from the learner user, the processor 24 is programmed to identify the learner profile record 48 associated with the first mobile computing device 62 using the mobile device ID and/or the mobile phone number associated with the first mobile computing device 62. In one embodiment, the processor 24 may be programmed to verify that the device transmitting the launch request is the same device associated with the learner user. For example, the processor 24 may display a phone number verification screen 64 (shown in FIGS. 10-11) on the first mobile computing device 62 prompting the learner user to provide a mobile phone number upon receiving the launch request. The processor 24 may then receive the mobile phone number from the learner user via the phone number verification screen 64 and transmit a verification code to the device associated with the received mobile phone number. The processor 24 may then displays the tutoring subject search page 60 on the first mobile computing device 62 upon receiving the verification code from the first mobile computing device 62.

In method step 206, the processor 24 accesses the learner profile data record 44 to retrieve search preferences including, for example, hourly rate data, distance data, and preference data, and accesses the tutor profile data file 42 and selects tutor data records 42 that include criteria matching the search criteria included in the retrieved leaner profile data record 44 and the search requests.

In method step 208, the processor 24 evaluates the selected tutor data records 42 to determine an availability of each tutor associated with a selected tutor record 42. The processor 24 then generates and displays the tutoring subject search page 60 including a list of tutor users associated with the selected tutor data records 42. In one embodiment, the processor 24 may display a ranked list of available tutors.

Referring again to FIG. 12, in the illustrated embodiment, the processor 24 is programmed to display the tutoring subject search page 60 including a plurality of tutoring subjects 66 and a plurality of tutor users associated with each tutoring subject 66. For example, the processor 24 identifies the learner profile record 48 associated with the first mobile computing device 62 and determines the geographic location of the learner user based on the learner geographic location information included in the identified learner profile record 48. The processor 24 then displays the tutoring subjects 66 on the tutoring subject search page 60, and displays eligible tutor users with each tutoring subject 66. In one embodiment, the processor 24 may be programmed to receive a current geographic location of the first mobile computing device 62 and set the learner geographic location information as the current geographic location of the first mobile computing device 62.

In the illustrated embodiment, for each of the tutoring subjects 66, the processor 24 is programmed to determine eligible tutor users and display a tutor profile image 68 associated with each determined eligible tutor. The processor 24 accesses the tutor profile data files 42 and identifies tutor profile records 46 that include tutoring subject category information matching a corresponding tutoring subject 66. The processor 24 then determines a geographic location of each tutor user associated with each identified tutor profile record 46 based on tutor geographic location information included in each identified tutor profile record 46, and identifies a travel distance limit of each identified tutor profile record 46. The processor 24 is programmed to determine eligible tutor profile records 46 based on the determined geographic location of the learner user, the determined geographic location of each tutor user associated with each identified tutor profile record 46, and a corresponding travel distance limit included in each identified tutor profile record 46. For example, the processor 24 may be programmed to determine a distance between the geographic location of the learner user and the geographic location of each tutor user associated with each identified tutor profile record 46 and select eligible tutor profile records 46 having a travel distance limit that is within the determine a distance. The processor 24 then displays a tutor profile image 68 associated with each determined eligible tutor profile record on the tutoring subject search page 60 with each tutor profile image 68 being displayed with the corresponding tutoring subject 66.

In method step 210, the processor 24 determines a location of one or more tutors included in the ranked list and generates and displays a map indicating a location of the learner and one or more tutors (shown in FIG. 37).

In one embodiment, the processor 24 may be programmed to execute algorithm 300 (shown in FIG. 4) to display the tutoring subject search page 60 upon receiving a search request from a leaner via the first mobile computing device 20.

Referring to FIGS. 12-13, in the illustrated embodiment, the processor 24 is also programmed to execute the following algorithm to display a tutor profile page 70 upon receiving a request from the learner user via the tutoring subject search page 60. For example, the processor 24 is programmed to receive a learner user's selection of a selected tutor profile image 68 via the tutoring subject search page 60, and select a corresponding tutor profile record 46 associated with the selected tutor profile image 68. The processor 24 then determines a geographic distance between the geographic location of the learner user and the geographic location of a corresponding tutor user associated with the corresponding tutor profile record 46 based on the tutor geographic location data included with the corresponding tutor profile record. The processor 24 then displays a tutor profile page 70 associated with the corresponding tutor profile record 46 including the determined geographic distance 72 between the geographic location of the learner user and the corresponding tutor user.

In one embodiment, the processor 24 may be programmed to display the tutor profile page 70 including the tutor profile information included in the corresponding tutor profile record 46 and each tutoring subject included in the tutoring subject category information of the corresponding tutor profile record 46.

Referring to FIGS. 13-14, in the illustrated embodiment, the processor 24 is also programmed to execute the following algorithm to connect the learner user with a selected tutor user to enable the leaner user to request tutoring sessions. For example, the processor 24 may be programmed to display the tutor profile page 70 including a connect request button 74. The processor 24 then transmits a connect request from the learner user to a second mobile computing device 76 associated with the corresponding tutor user upon receiving a learner user's selection of the connect request button 74. The processor 24 then receives an acceptance signal from the second mobile computing device 76 associated with the corresponding tutor user indicating acceptance of the connect request and updates the identified learner profile record 48 to associate a corresponding unique tutor ID included in the corresponding tutor profile record 46 with the learner user to indicate the learner user and the corresponding tutor user are connected.

In one embodiment, the processor 24 is also programmed to execute the following algorithm to initiate a tutoring session between the learner user and the tutor user. For example, the processor 24 may be programmed to receive a tutoring session request from the learner user via the tutoring subject search page 60 and responsively display a session request page 78 (shown in FIG. 14) on the first mobile computing device 62. The session request page 78 includes a list of tutor users 80 that are connected to the learner user, a date and time selection field 82, a duration selection field 84, and a session request button 86. The processor 24 then receives a tutor selection by the learner user of a tutor user from the displayed list of tutor users 80, receives a date/time selection by the learner user via the date and time selection field 82, and receives a duration selection by the learner user via the duration selection field 84. The processor 24 then determines a corresponding tutoring rate included in a corresponding tutor profile record 46 that is associated with the selected tutor user and calculates a tutoring price 88 based on the duration selection and the determined corresponding tutoring rate. The processor 24 also displays the calculated tutoring price 88 on the session request page 78.

The processor 24 is also programmed to receive a session scheduling transmittal request by the learner user via the session request page 78 when the learner user selects the session request button 86. Upon receiving the session scheduling transmittal request, the processor 24 transmits a tutoring session scheduling request to a second mobile computing device 76 associated with the selected tutor user. The tutoring session scheduling request includes information associated with the date/time selection, the duration selection, and the calculated tutoring price. The processor 24 then receives a confirmation message from the selected tutor user indicating acceptance of the tutoring session scheduling request and updates the learner profile record 48 to include the tutoring session scheduling request including the date/time selection, the duration selection, and the calculated tutoring price.

The processor 24 then initiates a tutoring session associated with the tutoring session scheduling request between the learner user and the selected tutor user by initiating a video call between the first mobile computing device 62 associated with the learner user and the second mobile computing device 76 associated with the selected tutor user, when the processor 24 determines the date and time associated with the tutoring session scheduling request has arrived.

The processor 24 also generates a session data record 50 associated with the initiated tutoring session including an associated tutor ID, an associated learner ID, a session duration, a calculated tutoring price, and a tutoring subject associated with the initiated tutoring session, and store the session data record 50 in the database.

Referring to FIGS. 15-17, in one embodiment, the processor 24 allows a user to navigate between the learner mode and a tutor mode. For example, in the learner mode, the processor 24 operates the tutoring subject search page 60 to enable the learner user to navigate and select tutors as well as request and initiate tutoring sessions. In the tutor mode, the processor 24 displays a tutor user summary page 90 that includes information associated with the tutor user including a number of tutoring sessions, number of connected learners, session frequency, and tutor ratings. For example, in one embodiment, the identified learner profile record 48 also includes an associated tutor ID. The processor 24 is programmed to display a learner profile page 92 on the first mobile computing device 62 upon receiving a learner profile page display request from the learner user. The processor 24 displays the learner profile page 92 including a tutor profile button 94. The processor 24 then receives a leaner user's selection of the tutor profile button 94 via the learner profile page 92 and then accesses a corresponding tutor profile record 46 matching the associated tutor ID included with the identified learner profile record 48, accesses session data files 40 that are associated with the associated tutor ID, and generates and displays a tutor user summary page 90 associated with the corresponding tutor profile record 46 including a number of tutoring sessions that have been conducted based on the accessed session data files.

Referring to FIG. 5, in one embodiment, the server computer processor 24 may be programmed to implement the algorithm 400 to initiate a tutoring session (shown in FIGS. 18-25) between a leaner and a tutor. In the illustrated embodiment, in method step 402, the processor 24 accesses a learner profile data records 44 to determine if a tutoring session should be initiated. For example, the processor 24 may search each leaner profile data records 44 and select records having data indicating a tutoring session is scheduled to occur at a current time and/or at a current day. Upon initiating a tutoring session, the processor 24 generates a session record 40 (shown in FIG. 8) associated with the initiated session including a tutor ID and learner ID associated with the corresponding tutor and learn respectively, and date/time data corresponding to a session start time.

In method step 404, the processor 24 transmits notifications to the mobile computing devices 20 associated with the tutor and learner to prompt the tutor and learner to initiate the tutor session.

Figure 19:
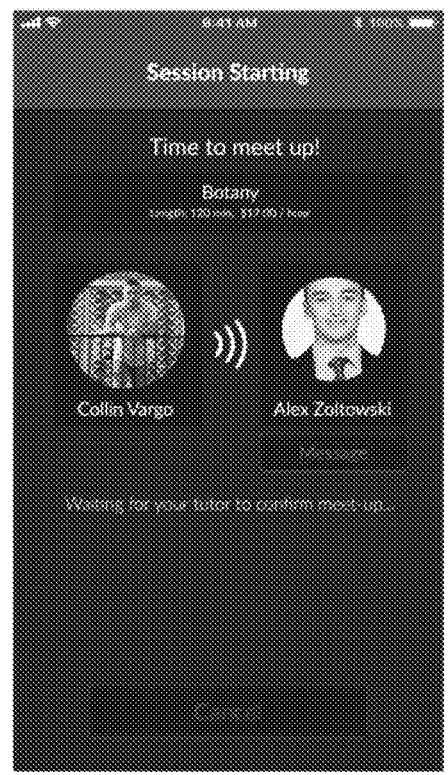
Figure 20:
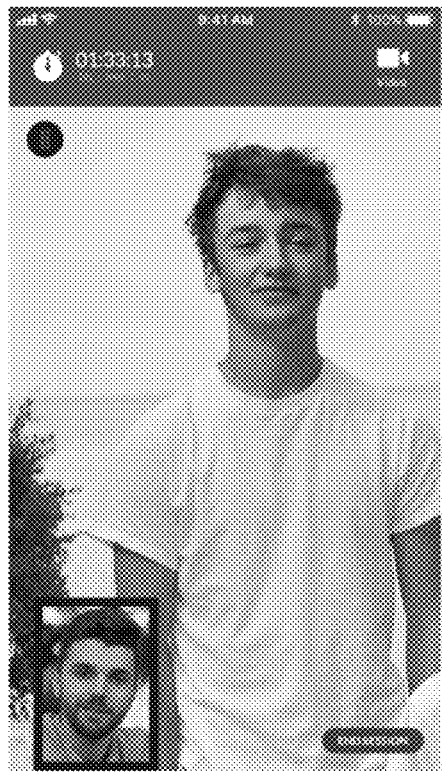
Figure 21:
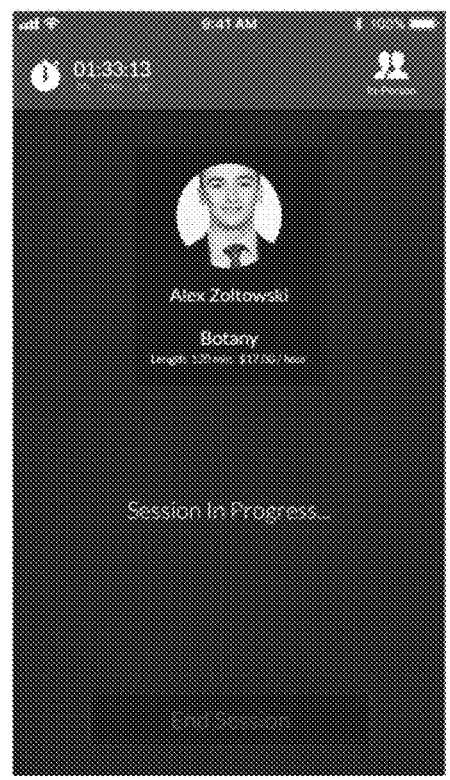
Figure 22:
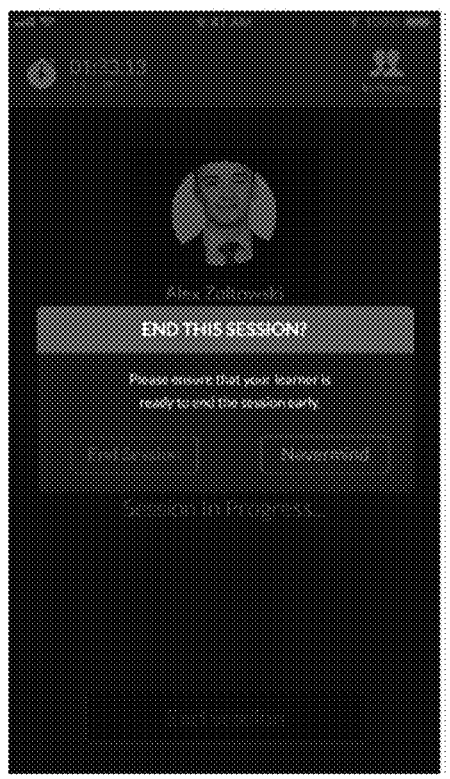
Figure 23:
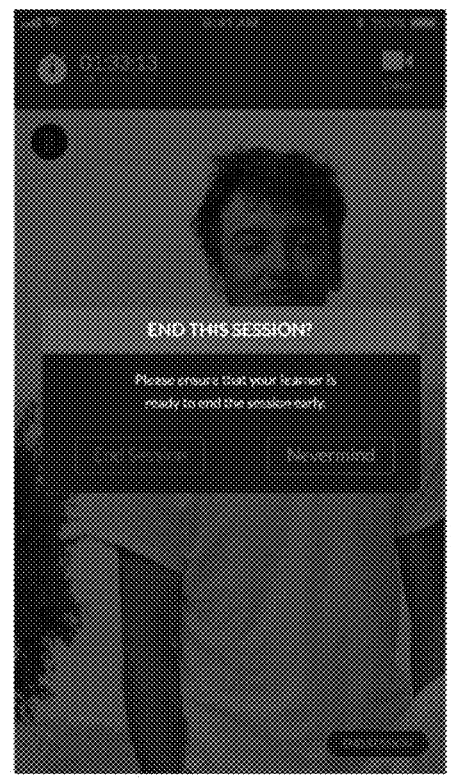

In method step 406, the processor 24 determines whether the learner has accepted a start of a tutoring session (shown in FIG. 19). If the leaner cancels the session, the processor 24 transmits a notification to the tutor and terminates the tutoring session. If the leaner accepts the session, the processor 24 proceeds to method step 408 to determine whether the tutor accepts the start of the tutoring session (shown in FIGS. 20-25). If the tutor cancels the session, the processor 24 transmits a notification to the leaner and terminates the tutoring session. If the tutor accepts the session, the processor 24 proceeds to method step 412 and modifies the session record 40 to include a start time.

Figure 24:
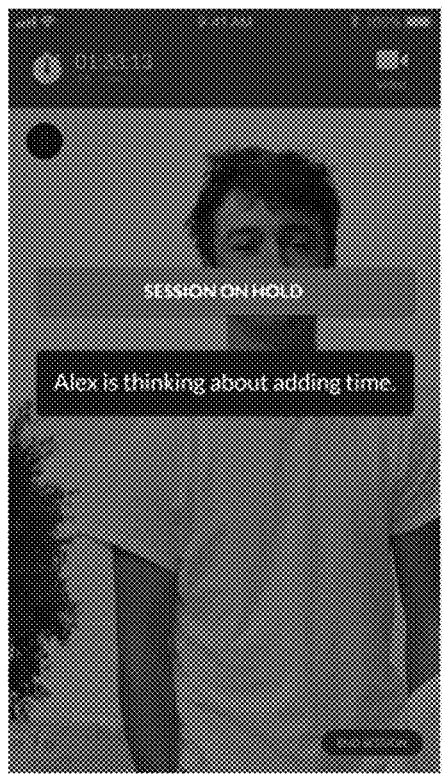
Figure 25:
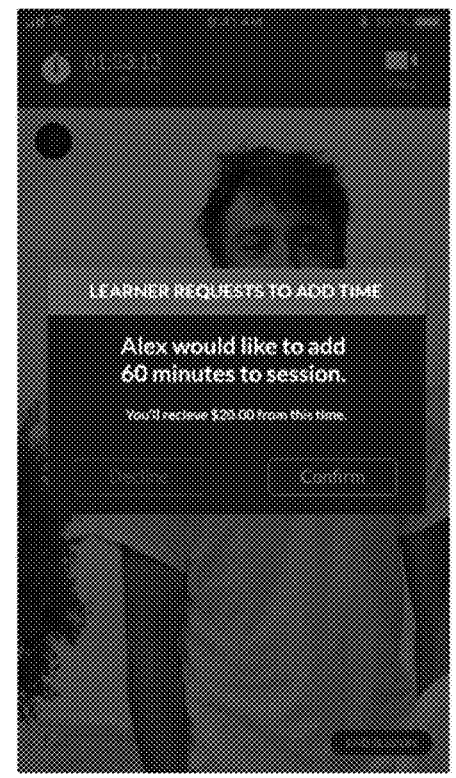
Figure 26:
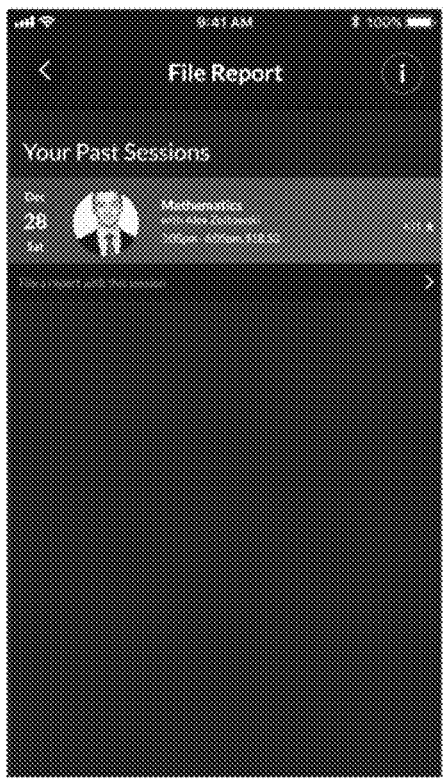
Figure 27:
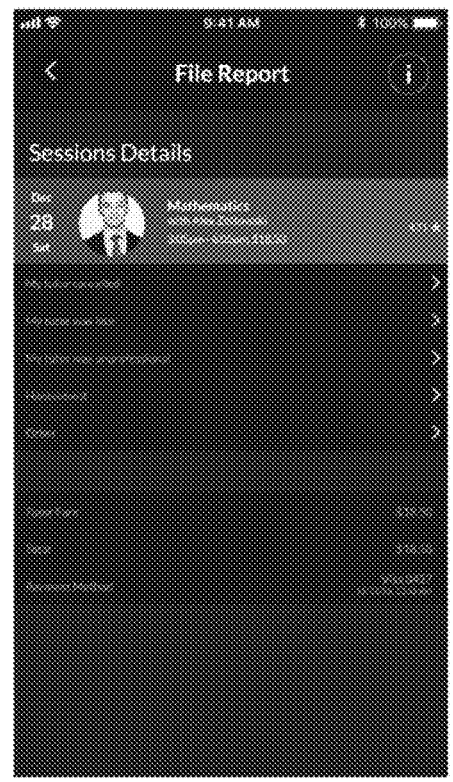
Figure 28:
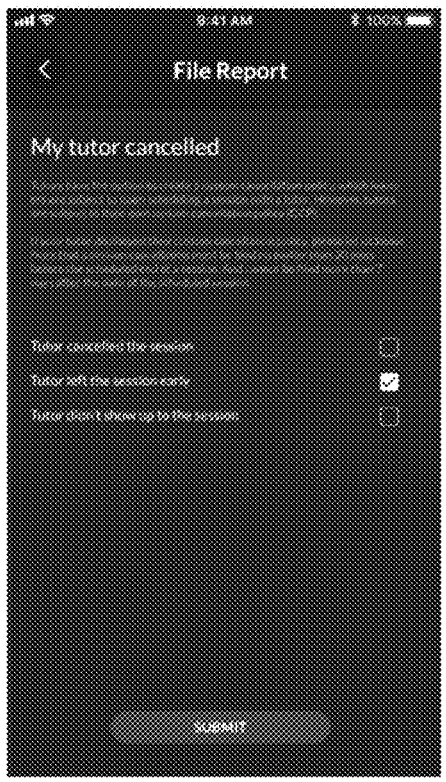
Figure 29:
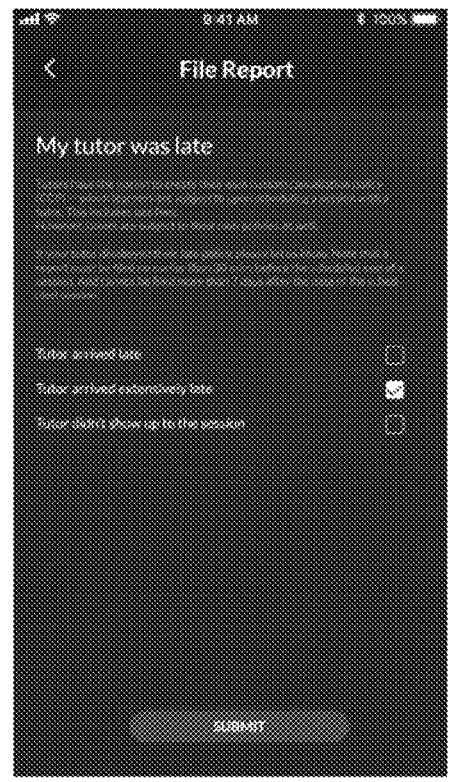

In method step 414, the processor 24 initiates a session timer and monitors a duration of the tutoring session and transmits a notification to the tutor and learner indicating the end of the scheduled session time and prompts the learner to indicate whether to continue the tutoring session (shown in FIG. 24). In method step 414, the processor 24 determines whether the learner has requested to extend the tutoring session. If the leaner requests to extend the tutoring session, the processor 24 proceeds to method step 416 and displays an added time request to the learner (shown in FIG. 25) and modifies the session timer to include the additional time requested by the leaner. In one embodiment, the processor 24 may transit a confirmation request to the tutor including the requested additional time, and modifies the session timer only if the tutor accepts the confirmation request. If the leaner ends the session, the processor 24 proceeds to method step 418 and determines a session payment charge associated with the tutoring session based on the hourly rate and session time, and updates the session record to include the session charge.

In one embodiment, the system 10 connects learner users to tutor users by allowing the leaner user to connecting with a tutor by tapping the purple "Connect" button at the bottom of a tutor's card or on their full profile. This will send a tutor a connection request. Connection requests are sent through the messaging system, which can be sent with manually typed messages or custom messages. A learner user will be unable to message a tutor again until the tutor user accepts the connection request. Connection requests that have not yet been accepted will appear in the "Tutors" tab. Once the connection request is accepted, the learner user will be able to communicate freely with the connected tutor user. Once connected with a tutor, the learner can go to the "Tutors" tab in the messaging system, which includes all message threads with tutors, and which display the tutor's location or university, the past sessions, tutor ratings, and the last message sent. To message a tutor, the learner user taps on the message thread in the "Tutors" tab to open messages.

Requesting Sessions: Once a learner has connected with a tutor, the learner can send session requests. Session requests can be scheduled as early as fifteen minutes in the future, and up to thirty days in advance. In one embodiment, the system 10 provides two ways to send a session request: 1.) Tapping the "+" icon in the messages with a tutor, selecting the "Request Session" button, and filling in the session details; or 2.) Selecting the "Request Session" button in the bottom right of the "Sessions" tab in messenger, selecting a tutor, and filling in the session details. Session requests that have not yet been accepted will appear under the "Pending" section in the "Sessions" tab of the messenger page. They will remain here until a tutor accepts the session request. Once accepted, they will appear under the "Upcoming" section in the "Sessions" tab.

Manually starting sessions: Leaners and tutors may agree to start session before the scheduled time. Both the learner and tutor can manually start sessions by going to the "Sessions" tab, tapping on the particular session in the "Upcoming" section, and then tapping "Start". Once a learner manually starts a session, the tutor will have to accept the manual start before the session can occur.

Automatic starting sessions: When it is time for a session to begin, the system 10 will initiate the session. Sessions starting: whether the session is started manually or automatically—If a user is outside of the app, the user will receive a push notification that will take the user into the session menu. If the user is inside the app when the session is manually or automatically started, the user will be taken directly to the session menu.

Video (online) tutoring sessions begin automatically when accepted. If the session is in-person, the learner and tutor will both be asked to confirm the meet up.

In-Session: In-person and online/video QuickTutor sessions are exactly the same. Both tutors and learners can leave or pause sessions at any time. A session can be paused by tapping on the "II" symbol. Learners are not penalized for leaving sessions early. Tutors may be subject to disciplinary action if leaving sessions early becomes a trend. A learner can report a tutor for canceling, being late to a session, or leaving a session early in the "File Report" tab of the settings bar. When a session's time is up, the system will prompt the learner whether to continue the session or end the session immediately. In the learner chooses to keep going, the system 10 will provide the learner with the option to choose how much more time the session will be. A tutor will have to accept this time addition, and then the session can continue. If a tutor denies the time addition, the session ends immediately.

Post-Session: After a session, the leaner will be asked if the learner would like to tip the tutor. After a session, the learner will also be asked to rate and review the tutor. Ratings will help other learners, increase the QuickTutor™ platform quality, and get rid of fraud tutors. Ratings and reviews are extremely important and should be taken seriously.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

Any combination of one or more computer-usable or computer-readable media (or medium) may be utilized. For example, a computer-readable media may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowchart and block diagrams in the flow diagrams illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable media that can direct a computer or other programmable data processing apparatus to function in a particular manner, such that the instructions stored in the computer-readable media produce an article of manufacture including instruction means which implement the function/act specified in the flowchart and/or block diagram block or blocks.

In some embodiments, a database, as described herein, includes any collection of data including hierarchical databases, relational databases, flat file databases, object-relational databases, object oriented databases, and any other structured collection of records or data that is stored in a computer system. The above examples are exemplary only, and thus are not intended to limit in any way the definition and/or meaning of the term database. Examples of databases include, but are not limited to only including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. A networked computer system for transmitting information between mobile computing devices, comprising:
a databased including a plurality of learner profile records and a plurality of tutor profile records, each learner profile record is associated with a learner user and includes a unique learner ID, a learner user's mobile phone number, and learner geographic location information, each tutor profile record is associated with a tutor user and includes a unique tutor ID, tutor profile information, tutoring subject category information, a tutor user's mobile phone number, tutor geographic location data, travel distance limit information, and a tutoring rate; and
a server computer for use in displaying information on a plurality mobile computing devices, the server computer including a processor coupled to a memory device, the processor is programmed to display the information on the plurality of mobile computing device by executing an algorithm including:
receiving a launch request from a first mobile computing device associated with a learner user to launch a tutor search application on the first mobile computing device, and responsively displaying a tutoring subject search page on the first mobile computing device by:
identifying a learner profile record associated with the first mobile computing device;
determining a geographic location of the learner user based on the learner geographic location information included in the identified learner profile record;
displaying a plurality of tutoring subjects on the tutoring subject search page; and
for each displayed tutoring subject:
identifying tutor profile records that include tutoring subject category information matching a corresponding tutoring subject;
determining a geographic location of each tutor user associated with each identified tutor profile record based on tutor geographic location information included in each identified tutor profile record;
identifying a travel distance limit of the corresponding identified tutor profile record;
determining eligible tutor profile records based on the determined geographic location of the learner user, the determined geographic location of each tutor user associated with each identified tutor profile record, and a corresponding travel distance limit included in each identified tutor profile record; and
displaying a tutor profile image associated with each determined eligible tutor profile record on the tutoring subject search page, each tutor profile image being displayed with the corresponding tutoring subject;
wherein each learner profile record includes a plurality of unique tutor IDs indicating each tutor user that is connected with each corresponding learner user, the processor is programmed to:
receive a tutoring session request from the learner user via the tutoring subject search page and responsively display a session request page on the first mobile computing device including a list of tutor users connected to the learner user, a date and time selection field, and a duration selection field;
receive a tutor selection by the learner user of a tutor user from the displayed list of tutor users;
receive a date/time selection by the learner user via the date and time selection field;
receive a duration selection by the learner user via the duration field;
determine a corresponding tutoring rate included in a corresponding tutor profile record associated with the selected tutor user and calculate a tutoring price based on the duration selection and the determined corresponding tutoring rate and display the calculated tutoring price on the session request page; and
receive a session scheduling transmittal request by the learner user via the session request page and transmit a tutoring session scheduling request to a second mobile computing device associated with the selected tutor user, the tutoring session scheduling request including the date/time selection, the duration selection, and the calculated tutoring price;
receive a confirmation message from the selected tutor user indicating acceptance of the tutoring session scheduling request; and
update the learner profile record to include the tutoring session scheduling request including the date/time selection, the duration selection, and the calculated tutoring price.

2. The networked computer system of claim 1, wherein the processor is programmed to receive a current geographic location of the first mobile computing device and set the learner geographic location information as the current geographic location of the first mobile computing device.

3. The networked computer system of claim 1, wherein the processor is programmed to:
receive a learner user's selection of a selected tutor profile image via the tutoring subject search page;
select a corresponding tutor profile record associated with the selected tutor profile image;
determine a distance between the geographic location of the learner user and the geographic location of a corresponding tutor user associated with the corresponding tutor profile record based on the tutor geographic location data included with the corresponding tutor profile record; and
display a tutor profile page associated with the corresponding tutor profile record including the determined geographic distance between the geographic location of the learner user and the corresponding tutor user.

4. The networked computer system of claim 3, wherein the processor is programmed to display the tutor profile page including the tutor profile information included in the corresponding tutor profile record and each tutoring subject included in the tutoring subject category information of the corresponding tutor profile record.

5. The networked computer system of claim 3, wherein the processor is programmed to:
display the tutor profile page including a connect request button, and
transmit a connect request from the learner user to a second mobile computing device associated with the corresponding tutor user upon receiving a learner user's selection of the connect request button.

6. The networked computer system of claim 5, wherein the processor is programmed to:
- receive an acceptance signal from the second mobile computing device associated with the corresponding tutor user indicating acceptance of the connect request; and
- update the identified learner profile record to associate a corresponding unique tutor ID included in the corresponding tutor profile record with the learner user to indicate the learner user and the corresponding tutor user are connected.

7. The networked computer system of claim 1, wherein the processor is programmed to initiate a tutoring session associated with the tutoring session scheduling request between the learner user and the selected tutor user by initiating a video call between the first mobile computing device associated with the learner user and the second mobile device associated with the selected tutor user.

8. The networked computer system of claim 1, wherein the processor is programmed to generate a session data record associated with the initiated tutoring session including an associated tutor ID, an associated learner ID, a session duration, a calculated tutoring price, and a tutoring subject associated with the initiated tutoring session, and store the session data record in the database.

9. The networked computer system of claim 8, wherein the identified learner profile record includes an associated tutor ID, the processor is programmed to:
- display a learner profile page on the first mobile computing device upon receiving a learner profile page display request from the learner user, the learner profile page displaying a tutor profile button;
- receive a leaner user's selection of the tutor profile button via the learner profile page and responsively:
- access a corresponding tutor profile record matching the associated tutor ID included with the identified learner profile record;
- access session data records associated with the associated tutor ID; and
- display a tutor user summary page associated with the corresponding tutor profile record including a number of tutoring sessions that have been conducted based on the accessed session data records.

10. The networked computer system of claim 1, wherein the processor is programmed to:
- display a phone number verification screen on the first mobile computing device prompting the learner user to provide a mobile phone number upon receiving the launch request;
- upon receiving the mobile phone number from the learner user via the phone number verification screen, transmit a verification code to a device associated with the received mobile phone number and display a verification code screen on the first mobile computer device prompting the learner user to enter the verification code; and
- display the tutoring subject search screen on the first mobile computing device upon receiving the verification code from the first mobile computing device.

11. A method of operating a networked computer system for transmitting information between mobile computing devices, the networked computer system including a server computer for use in displaying information on a plurality mobile computing devices, the server computer including a data file stored in a memory device and a processor coupled to the memory device, the data file including a plurality of learner profile records and a plurality of tutor profile records, each learner profile record is associated with a learner user and includes a unique learner ID, a learner user's mobile phone number, and learner geographic location information, each tutor profile record is associated with a tutor user and includes a unique tutor ID, tutor profile information, tutoring subject category information, a tutor user's mobile phone number, tutor geographic location data, travel distance limit information, and a tutoring rate, the processor is programmed to display the information on the plurality of mobile computing device, the method comprising the processor performing the steps of:
- receiving a launch request from a first mobile computing device associated with a learner user to launch a tutor search application on the first mobile computing device, and responsively displaying a tutoring subject search page on the first mobile computing device by:
- identifying a learner profile record associated with the first mobile computing device;
- determining a geographic location of the learner user based on the learner geographic location information included in the identified learner profile record;
- displaying a plurality of tutoring subjects on the tutoring subject search page; and
- for each displayed tutoring subject:
- identify tutor profile records that include tutoring subject category information matching a corresponding tutoring subject;
- determining a geographic location of each tutor user associated with each identified tutor profile record based on tutor geographic location information included in each identified tutor profile record;
- identifying a travel distance limit of the corresponding identified tutor profile record;
- determining eligible tutor profile records based on the determined geographic location of the learner user, the determined geographic location of each tutor user associated with each identified tutor profile record, and a corresponding travel distance limit included in each identified tutor profile record; and
- displaying a tutor profile image associated with each determined eligible tutor profile record on the tutoring subject search page, each tutor profile image being displayed with the corresponding tutoring subject;
- wherein each learner profile record includes a plurality of unique tutor IDs indicating each tutor user that is connected with each corresponding learner user, the method including the processor performing the steps of:
- receiving a tutoring session request from the learner user via the tutoring subject search page and responsively displaying a session request page on the first mobile computing device including a list of tutor users connected to the learner user, a date and time selection field, and a duration selection field;
- receiving a tutor selection by the learner user of a tutor user from the displayed list of tutor users;
- receiving a date/time selection by the learner user via the date and time selection field;
- receiving a duration selection by the learner user via the duration field;
- determining a corresponding tutoring rate included in a corresponding tutor profile record associated with the selected tutor user and calculate a tutoring price based on the duration selection and the determined corresponding tutoring rate and display the calculated tutoring price on the session request page;

receiving a session scheduling transmittal request by the learner user via the session request page and transmitting a tutoring session scheduling request to a second mobile computing device associated with the selected tutor user, the tutoring session scheduling request including the date/time selection, the duration selection, and the calculated tutoring price;

receiving a confirmation message from the selected tutor user indicating acceptance of the tutoring session scheduling request; and updating the learner profile record to include the tutoring session scheduling request including the date/time selection, the duration selection, and the calculated tutoring price.

12. The method of claim 11, including the processor performing the steps of:

receiving a learner user's selection of a selected tutor profile image via the tutoring subject search page;

selecting a corresponding tutor profile record associated with the selected tutor profile image;

determining a distance between the geographic location of the learner user and the geographic location of a corresponding tutor user associated with the corresponding tutor profile record based on the tutor geographic location data included with the corresponding tutor profile record; and displaying a tutor profile page associated with the corresponding tutor profile record including the determined geographic distance between the geographic location of the learner user and the corresponding tutor user.

13. The method of claim 12, including the processor performing the steps of:

displaying the tutor profile page including a connect request button;

transmitting a connect request from the learner user to a second mobile computing device associated with the corresponding tutor user upon receiving a learner user's selection of the connect request button;

receiving an acceptance signal from the second mobile computing device associated with the corresponding tutor user indicating acceptance of the connect request; and updating the identified learner profile record to associate a corresponding unique tutor ID included in the corresponding tutor profile record with the learner user to indicate the learner user and the corresponding tutor user are connected.

14. The method of claim 11, including the processor performing the steps of:

initiating a tutoring session associated with the tutoring session scheduling request between the learner user and the selected tutor user by initiating a video call between the first mobile computing device associated with the learner user and the second mobile device associated with the selected tutor user; and generating a session data record associated with the initiated tutoring session including an associated tutor ID, an associated learner ID, a session duration, a calculated tutoring price, and a tutoring subject associated with the initiated tutoring session, and storing the session data record in the database.

15. The method of claim 11, wherein the identified learner profile record includes an associated tutor ID, the method including the processor performing the steps of:

displaying a learner profile page on the first mobile computing device upon receiving a learner profile page display request from the learner user, the learner profile page displaying a tutor profile button;

receiving a leaner user's selection of the tutor profile button via the learner profile page and responsively:

accessing a corresponding tutor profile record matching the associated tutor ID included with the identified learner profile record;

accessing session data records associated with the associated tutor ID; and displaying a tutor user summary page associated with the corresponding tutor profile record including a number of tutoring sessions that have been conducted based on the accessed session data records.

16. One or more non-transitory computer-readable storage media, having computer-executable instructions embodied thereon, wherein when executed by at least one processor, the computer-executable instructions cause the at least one processor to:

store a plurality of learner profile records and a plurality of tutor profile records in a database, each learner profile record is associated with a learner user and includes a unique learner ID, a learner user's mobile phone number, and learner geographic location information, each tutor profile record is associated with a tutor user and includes a unique tutor ID, tutor profile information, tutoring subject category information, a tutor user's mobile phone number, tutor geographic location data, travel distance limit information, and a tutoring rate;

receive a launch request from a first mobile computing device associated with a learner user to launch a tutor search application on the first mobile computing device, and responsively display a tutoring subject search page on the first mobile computing device by:

identify a learner profile record associated with the first mobile computing device;

determine a geographic location of the learner user based on the learner geographic location information included in the identified learner profile record;

display a plurality of tutoring subjects on the tutoring subject search page; and for each displayed tutoring subject:

identify tutor profile records that include tutoring subject category information matching a corresponding tutoring subject;

determine a geographic location of each tutor user associated with each identified tutor profile record based on tutor geographic location information included in each identified tutor profile record;

identify a travel distance limit of the corresponding identified tutor profile record;

determine eligible tutor profile records based on the determined geographic location of the learner user, the determined geographic location of each tutor user associated with each identified tutor profile record, and a corresponding travel distance limit included in each identified tutor profile record; and display a tutor profile image associated with each determined eligible tutor profile record on the tutoring subject search page, each tutor profile image being displayed with the corresponding tutoring subject;

wherein each learner profile record includes a plurality of unique tutor IDs indicating each tutor user that is connected with each corresponding learner user, the computer-executable instructions cause the at least one processor to:

receive a tutoring session request from the learner user via the tutoring subject search page and responsively display a session request page on the first mobile computing device including a list of tutor users connected to the learner user, a date and time selection field, and a duration selection field;

receive a tutor selection by the learner user of a tutor user from the displayed list of tutor users;

receive a date/time selection by the learner user via the date and time selection field;

receive a duration selection by the learner user via the duration field;

determine a corresponding tutoring rate included in a corresponding tutor profile record associated with the selected tutor user and calculate a tutoring price based on the duration selection and the determined corresponding tutoring rate and display the calculated tutoring price on the session request page; and receive a session scheduling transmittal request by the learner user via the session request page and transmit a tutoring session scheduling request to a second mobile computing device associated with the selected tutor user, the tutoring session scheduling request including the date/time selection, the duration selection, and the calculated tutoring price;

receive a confirmation message from the selected tutor user indicating acceptance of the tutoring session scheduling request; and update the learner profile record to include the tutoring session scheduling request including the date/time selection, the duration selection, and the calculated tutoring price.

\* \* \* \* \*

UNITED STATES PATENT AND TRADEMARK OFFICE
CERTIFICATE OF CORRECTION

PATENT NO. : 11,063,776 B2  
APPLICATION NO. : 16/383493  
DATED : July 13, 2021  
INVENTOR(S) : Collin J. Vargo Page 1 of 2

It is certified that error appears in the above-identified patent and that said Letters Patent is hereby corrected as shown below:

In the Drawings

In FIG. 3: please delete "leaner/tutor" and replace with -- learner/tutor --  
In FIG. 5: please delete "leaner accept session" and replace with -- learner accept session --  
In FIG. 7: please delete "Leaner125" and "Leaner201" and replace with -- Learner 125 -- and -- Learner 201 --  
In FIG. 8: please delete "Leaner012" and replace with -- Learner012 --

In the Specification

Column 5, Line 14: please delete "leaner" and replace with -- learner --  
Column 8, Line 17: please delete "leaner" and replace with -- learner --  
Column 8, Line 38: please delete "leaner" and replace with -- learner --  
Column 8, Line 49: please delete "leaner" and replace with -- learner --  
Column 22, Line 40: please delete "leaner" and replace with -- learner --  
Column 22, Line 66: please delete "leaner" and replace with -- learner --  
Column 23, Line 61: please delete "leaner" and replace with -- learner --  
Column 24, Line 24: please delete "leaner" and replace with -- learner --  
Column 25, Line 43: please delete "leaner" and replace with -- learner --  
Column 25, Line 56: please delete "leaner" and replace with -- learner --  
Column 25, Line 60: please delete "leaner" and replace with -- learner --  
Column 26, Line 7: please delete "leaner" and replace with -- learner --  
Column 26, Line 9: please delete "leaner" and replace with -- learner --  
Column 26, Line 13: please delete "leaner" and replace with -- learner --  
Column 26, Line 24: please delete "leaner" and replace with -- learner --  
Column 26, Line 28: please delete "leaner" and replace with -- learner --  
Column 26, Line 32: please delete "leaner" and replace with -- learner --  
Column 26, Line 38: please delete "leaner" and replace with -- learner --  
Column 27, Line 3: please delete "leaner" and replace with -- learner --  
Column 27, Line 37: please delete "leaner" and replace with -- learner --

Signed and Sealed this  
Fourth Day of January, 2022

Drew Hirshfeld  
*Performing the Functions and Duties of the*  
*Under Secretary of Commerce for Intellectual Property and*  
*Director of the United States Patent and Trademark Office*

CERTIFICATE OF CORRECTION (continued)
U.S. Pat. No. 11,063,776 B2

In the Claims

Column 31, Line 33: please delete "a leaner user's" and replace with -- a learner user's --
Column 34, Line 3: please delete "a leaner user's" and replace with -- a learner user's --